US009337898B2

(12) United States Patent
Albiston et al.

(10) Patent No.: US 9,337,898 B2
(45) Date of Patent: *May 10, 2016

(54) DIGITAL INTERCOM NETWORK OVER DC-POWERED MICROPHONE CABLE

(71) Applicant: CLEAR-COM LLC, Poway, CA (US)

(72) Inventors: David Albiston, Bishop's Stortford (GB); Nigel Gordon, Ware (GB); David Prime, Sandy (GB)

(73) Assignee: CLEAR-COM LLC, Poway, CA (US)

( * ) Notice: Subject to any disclaimer, the term of this patent is extended or adjusted under 35 U.S.C. 154(b) by 319 days.

This patent is subject to a terminal disclaimer.

(21) Appl. No.: 13/673,769

(22) Filed: Nov. 9, 2012

(65) Prior Publication Data

US 2013/0064360 A1    Mar. 14, 2013

Related U.S. Application Data

(63) Continuation of application No. 12/423,200, filed on Apr. 14, 2009, now Pat. No. 8,311,085.

(51) Int. Cl.
*H04B 3/58*        (2006.01)
*H04B 3/54*        (2006.01)

(52) U.S. Cl.
CPC ............... *H04B 3/548* (2013.01); *H04B 3/58* (2013.01); *H04B 2203/545* (2013.01); *H04B 2203/5445* (2013.01)

(58) Field of Classification Search
CPC .......... H04M 1/72513; H04M 1/0291; H04M 11/02; H04B 3/548; H04B 3/58
USPC ..................................... 379/167.01
See application file for complete search history.

(56) References Cited

U.S. PATENT DOCUMENTS 3,573,379 A    4/1971    Schmitz
3,924,077 A    12/1975    Blakeslee
(Continued)

FOREIGN PATENT DOCUMENTS

WO        0072560 A1    11/2000
WO    2004049683 A2    6/2004
(Continued)

OTHER PUBLICATIONS

PoE—Power Over Ethernet, printed on Mar. 30, 2009 from http://www.altair.org/labnotes.sub.--POE.html.
(Continued)

*Primary Examiner* — Sonia Gay
(74) *Attorney, Agent, or Firm* — Sheppard Mullin Richter & Hampton LLP

(57) ABSTRACT

A digital intercom system provides DC power and multi-channel bidirectional digital communications over existing cabling such as microphone cabling used in analog intercom networks. Three or more conductors in the cabling are used for both transmitting and receiving digital signals and carrying DC power. The digital intercom system includes digital user stations and a digital master station which can be used to retrofit an existing analog intercom network or deployed in a new network. User stations can be connected to the cabling via drop cables which do not use active electronic components. The master station routes digital audio and control data packets in three or more channels based on respective network addresses of the user stations to provide point-to-point, point-to-multi-point, and party line communications among the user stations. Sessions and groups can be configured which define talker and listener user stations.

11 Claims, 19 Drawing Sheets

(56) References Cited

U.S. PATENT DOCUMENTS

| | | |
|---|---|---|
| 3,935,396 A | 1/1976 | Barsellotti |
| 3,941,936 A | 3/1976 | Graham |
| 4,059,735 A | 11/1977 | Betts |
| 4,188,511 A | 2/1980 | Edwards |
| 4,292,475 A | 9/1981 | Hill |
| 4,313,033 A | 1/1982 | Walker |
| 4,359,603 A | 11/1982 | Heaton |
| 4,381,427 A | 4/1983 | Cheal |
| 4,382,295 A | 5/1983 | Moffitt |
| 4,389,720 A | 6/1983 | Baxter |
| 4,416,007 A | 11/1983 | Huizinga |
| 4,499,578 A | 2/1985 | Marouf |
| 4,518,821 A | 5/1985 | Yuter |
| 4,558,180 A | 12/1985 | Scordo |
| 4,606,021 A | 8/1986 | Wurst |
| 4,646,288 A | 2/1987 | Shumway |
| 4,648,108 A | 3/1987 | Ellis |
| 4,658,398 A | 4/1987 | Hsing |
| 4,685,134 A | 8/1987 | Wine |
| 4,716,585 A | 12/1987 | Tompkins |
| 4,726,016 A | 2/1988 | Uchida |
| 4,730,306 A | 3/1988 | Uchida |
| 4,739,205 A | 4/1988 | Fuhrman |
| 4,740,955 A | 4/1988 | Litterer |
| 4,797,877 A | 1/1989 | Pope |
| 4,809,262 A | 2/1989 | Klose |
| 4,809,270 A | 2/1989 | Baxter |
| 4,839,888 A | 6/1989 | Baltz |
| 4,849,750 A | 7/1989 | Andros et al. |
| 4,901,308 A | 2/1990 | Deschaine |
| 4,924,464 A | 5/1990 | Baylock |
| 4,947,440 A | 8/1990 | Bateman |
| 4,993,073 A | 2/1991 | Sparkes |
| 5,027,347 A | 6/1991 | Malkki |
| 5,072,442 A | 12/1991 | Todd |
| 5,128,928 A | 7/1992 | Wilder |
| 5,136,585 A | 8/1992 | Nizamuddin |
| 5,175,727 A | 12/1992 | Maher |
| 5,191,593 A | 3/1993 | McDonald |
| 5,195,086 A | 3/1993 | Baumgartner |
| 5,224,094 A | 6/1993 | Maher |
| 5,228,026 A | 7/1993 | Albrow |
| 5,228,076 A | 7/1993 | Hopner |
| 5,229,989 A | 7/1993 | Maher |
| 5,241,701 A | 8/1993 | Andoh |
| 5,260,938 A | 11/1993 | Hofmann |
| 5,260,941 A | 11/1993 | Wilder |
| 5,276,678 A | 1/1994 | Hendrickson |
| 5,309,517 A | 5/1994 | Barclay |
| 5,321,848 A | 6/1994 | Miyahira |
| 5,329,579 A | 7/1994 | Brunson |
| 5,357,511 A | 10/1994 | DiNapoli |
| 5,392,278 A | 2/1995 | Teel |
| 5,416,779 A | 5/1995 | Barnes |
| 5,416,827 A | 5/1995 | Gaskill |
| 5,420,860 A | 5/1995 | Stevens |
| 5,430,725 A | 7/1995 | Field |
| 5,436,896 A | 7/1995 | Anderson |
| 5,440,545 A | 8/1995 | Buchholz |
| 5,483,528 A | 1/1996 | Christensen |
| 5,515,228 A | 5/1996 | Nakayama et al. |
| 5,533,112 A | 7/1996 | Danneels |
| 5,546,077 A | 8/1996 | Lipp et al. |
| 5,594,727 A | 1/1997 | Kolbenson |
| 5,715,245 A | 2/1998 | Suonvieri |
| 5,719,858 A | 2/1998 | Moore |
| 5,991,634 A | 11/1999 | Hui |
| 6,044,268 A | 3/2000 | Haartsen |
| 6,061,348 A | 5/2000 | Castrigno |
| 6,069,878 A | 5/2000 | Christensen |
| 6,072,994 A | 6/2000 | Phillips et al. |
| 6,087,927 A | 7/2000 | Battistini |
| 6,173,157 B1 | 1/2001 | Godoroja et al. |
| 6,249,527 B1 | 6/2001 | Verthein |
| 6,346,890 B1 | 2/2002 | Bellin |
| 6,393,298 B1 | 5/2002 | Fulton |
| 6,437,743 B1 | 8/2002 | Mintz |
| 6,438,111 B1 | 8/2002 | Catanzaro |
| 6,466,550 B1 | 10/2002 | Foster |
| 6,661,997 B2 | 12/2003 | Ogo |
| 6,671,262 B1 | 12/2003 | Kung |
| 6,687,358 B1 | 2/2004 | Mark |
| 6,696,922 B1 | 2/2004 | Wong et al. |
| 6,717,921 B1 | 4/2004 | Aggarwal |
| 6,728,221 B1 | 4/2004 | Shaffer |
| 6,782,413 B1 | 8/2004 | Loveland |
| 6,888,935 B1 | 5/2005 | Day |
| 6,920,318 B2 | 7/2005 | Brooking et al. |
| 6,940,826 B1 | 9/2005 | Simard |
| 6,956,828 B2 | 10/2005 | Simard |
| 6,965,868 B1 | 11/2005 | Bednarek |
| 6,973,437 B1 | 12/2005 | Olewicz |
| 7,151,943 B2 | 12/2006 | Comer et al. |
| 7,199,706 B2 | 4/2007 | Dawson |
| 7,233,580 B2 | 6/2007 | Moss |
| 7,236,087 B2 | 6/2007 | Vasquez et al. |
| 7,242,951 B2 | 7/2007 | Helferich |
| 7,313,593 B1 | 12/2007 | Pulito |
| 7,333,821 B2 | 2/2008 | Willey |
| 7,366,512 B1 | 4/2008 | Kefalas et al. |
| 7,385,479 B1 | 6/2008 | Green et al. |
| 7,711,359 B2 | 5/2010 | Netanel et al. |
| 7,778,594 B2 | 8/2010 | Childers et al. |
| 7,869,424 B2 | 1/2011 | Delveaux et al. |
| 8,015,309 B2 | 9/2011 | Gentle et al. |
| 8,122,131 B2 | 2/2012 | Baum et al. |
| 8,271,340 B2 | 9/2012 | Awiszus |
| 8,334,891 B2 | 12/2012 | Graham |
| 2002/0015398 A1* | 2/2002 | Kikinis ..................... 370/338 |
| 2002/0037054 A1 | 3/2002 | Schurig |
| 2002/0105412 A1 | 8/2002 | Carissimo |
| 2002/0137500 A1 | 9/2002 | Brooking et al. |
| 2003/0125954 A1 | 7/2003 | Bradley |
| 2003/0224815 A1 | 12/2003 | Rodman |
| 2003/0225622 A1 | 12/2003 | Doan |
| 2004/0116071 A1 | 6/2004 | Hall |
| 2004/0213402 A1 | 10/2004 | Ruetschi |
| 2004/0249983 A1 | 12/2004 | Bedner |
| 2005/0008024 A1 | 1/2005 | Newpol |
| 2005/0041603 A1 | 2/2005 | Tighe |
| 2005/0068904 A1 | 3/2005 | Wildfeuer |
| 2005/0076081 A1 | 4/2005 | Rui |
| 2005/0099291 A1 | 5/2005 | Landau |
| 2005/0122389 A1 | 6/2005 | Miao |
| 2005/0135280 A1 | 6/2005 | Lam |
| 2005/0212685 A1 | 9/2005 | Gordon |
| 2005/0260978 A1 | 11/2005 | Rader |
| 2006/0017542 A1 | 1/2006 | Holloway et al. |
| 2006/0041482 A1 | 2/2006 | Awiszus |
| 2006/0050658 A1 | 3/2006 | Shaffer |
| 2006/0056386 A1 | 3/2006 | Stogel |
| 2006/0146737 A1 | 7/2006 | Ohrstrom |
| 2006/0222153 A1* | 10/2006 | Tarkoff et al. ............... 379/159 |
| 2006/0248221 A1 | 11/2006 | Hottel et al. |
| 2006/0258334 A1 | 11/2006 | Tarallo |
| 2007/0019571 A1 | 1/2007 | Stogel |
| 2007/0040652 A1 | 2/2007 | Quatro |
| 2007/0047712 A1 | 3/2007 | Gross |
| 2007/0160081 A1 | 7/2007 | Logvinov |
| 2007/0168468 A1 | 7/2007 | Stogel |
| 2007/0191000 A1 | 8/2007 | Veni et al. |
| 2007/0192196 A1 | 8/2007 | Awiszus |
| 2007/0208626 A1 | 9/2007 | Awiszus |
| 2008/0084831 A1 | 4/2008 | Sylvain |
| 2008/0211663 A1 | 9/2008 | Mansfield |
| 2008/0300025 A1 | 12/2008 | Song |
| 2009/0013025 A1 | 1/2009 | Soejima |
| 2010/0178869 A1 | 7/2010 | Mauney |
| 2010/0246788 A1 | 9/2010 | Mernard et al. |

(56) References Cited

U.S. PATENT DOCUMENTS

2010/0262689 A1* 10/2010 Ungermann et al. ......... 709/224
2011/0286605 A1 11/2011 Furuta

FOREIGN PATENT DOCUMENTS

| WO | 2004081805 A1 | 9/2004 |
|---|---|---|
| WO | 2006116750 A2 | 11/2006 |
| WO | WO2009015460 | 5/2009 |

OTHER PUBLICATIONS

Intellon INT6300 Product Brief, Intellon Corp., Orlando, Florida 2008.
XLR Connector, Wikipedia, http://en.wikipedia.org, Mar. 21, 2009.
Understanding Microphone Cables, printed from http://www.procosoundcom/?page=downloads on Mar. 24, 2009.
New Power Over Ethernet TCP/IP Intercom, Digital Acoustics Corp., http://www.poweroverethernet.com/products php?article_id=61, Sep. 29, 2004.
AES3, Digital Audio Interface Format, file:///I/Z/vtec/1003US0/references/AESshtml, printed Mar. 19, 2009.
HomePlug AV Technology Overview, Intellon Corp., Orlando, Florida 2008.
IP Ethernet Intercoms and Paging, Digital Acoustic Corp., printed on Mar. 18, 2009.
Clear-Com to Debut Hybrid TDM/IP Intercom Network at NAB 2009, press release, Clear-Com® Communication Systems, Feb. 11, 2009.
Performer: The Digital Partyline Experience, Riedel Communications, product brochure, Sep. 2008.
Telex, "Handbook of intercom system engineering", Chapter 2 pp. 1-20 Mar. 2002. (online at ftp://ftp.axon.tv/Brochures/Telex/Handbook%20of%20Intercome%20Systems%20E- ngineerin.
International Bureau of WIPO, PCT/IB/373, International Preliminary Report on Patentability for PCT/US10/31078, Oct. 18, 2011, pp. 1-6.
Application Note—Power Over Ethernet (PoE), www.cuesystem.com, Czech Republic, Sep. 12, 2007.
Handbook of Intercom Systems Engineering, 1st ed., Telex Communications Inc., 2007.
"Quail Digital Upgrades Drive-Thru Headset System", QSR, Industry News, Mar. 10, 2013, 2 pages.

* cited by examiner

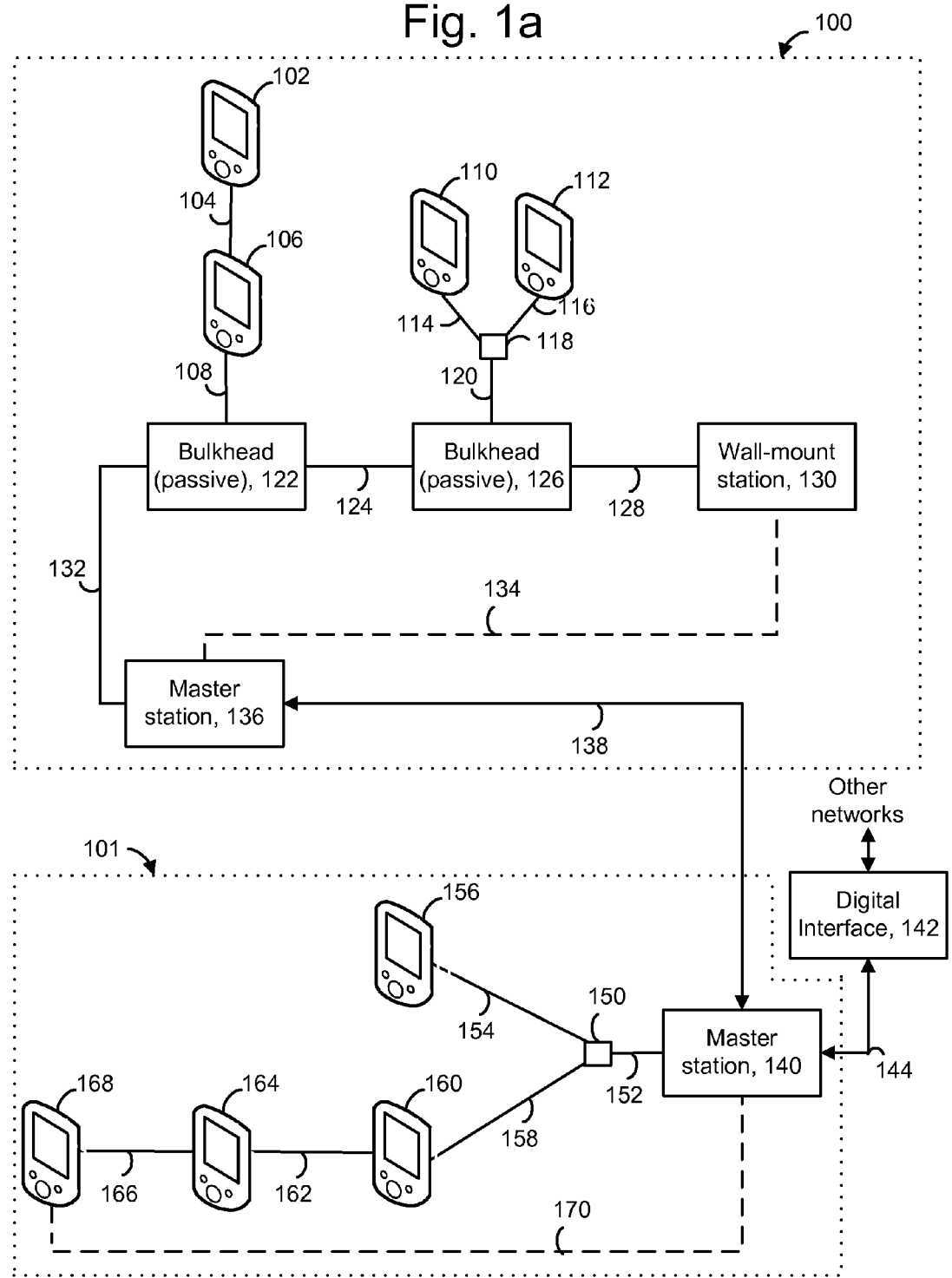

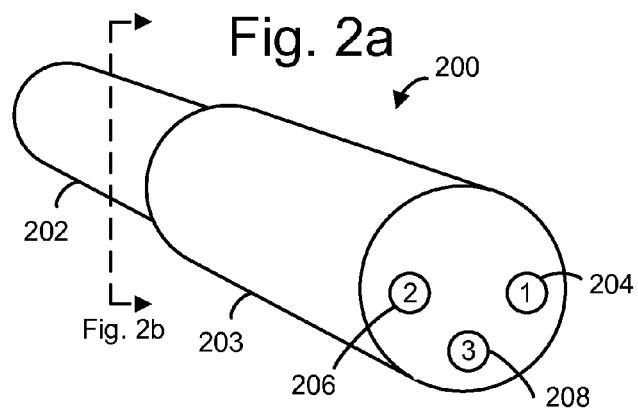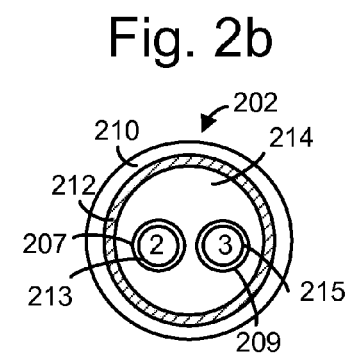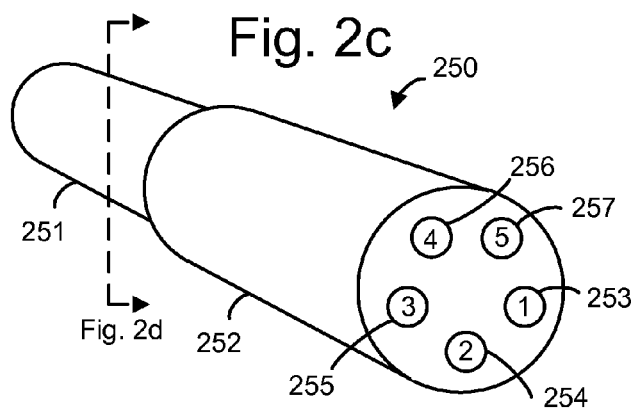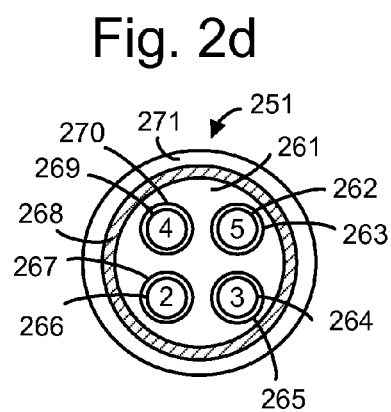

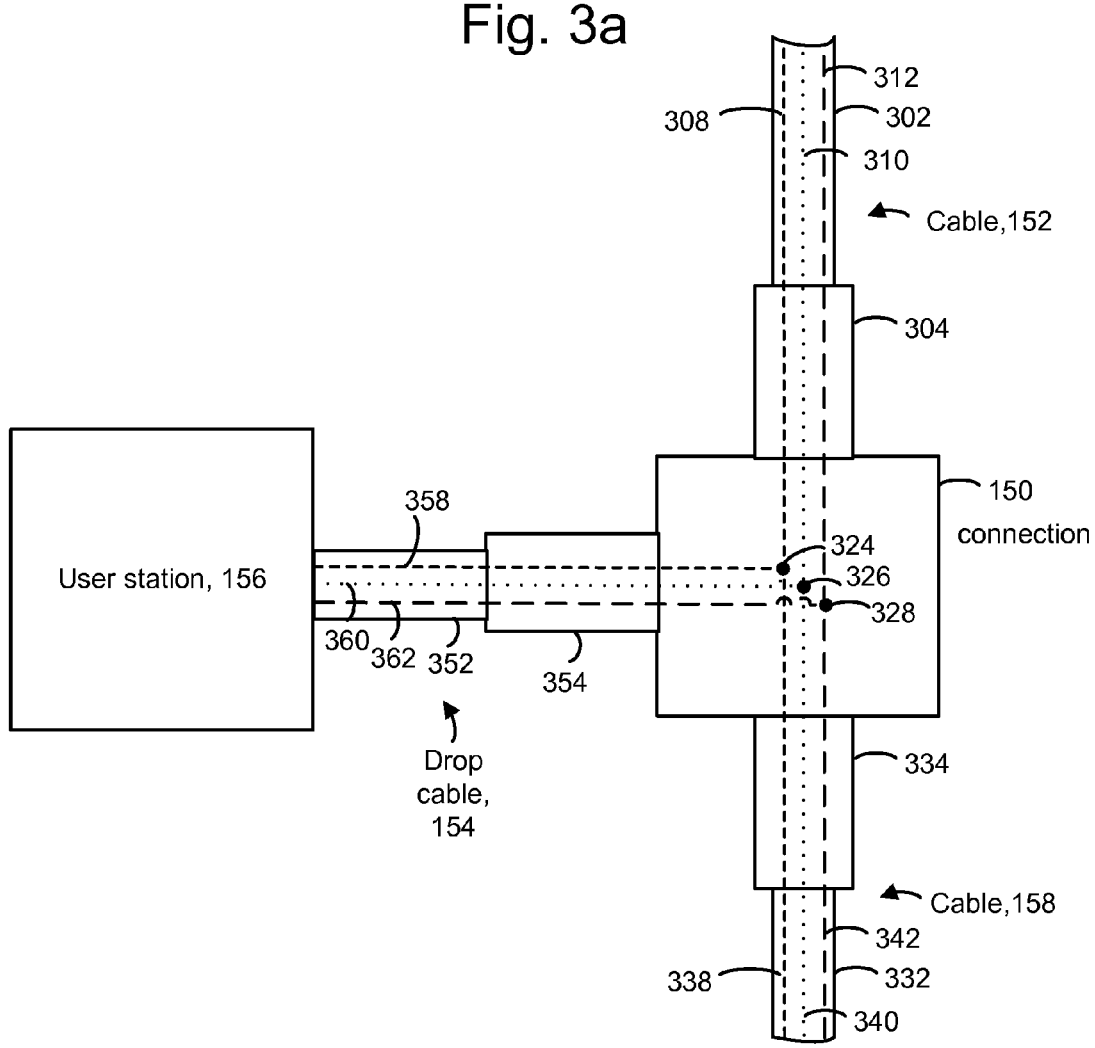

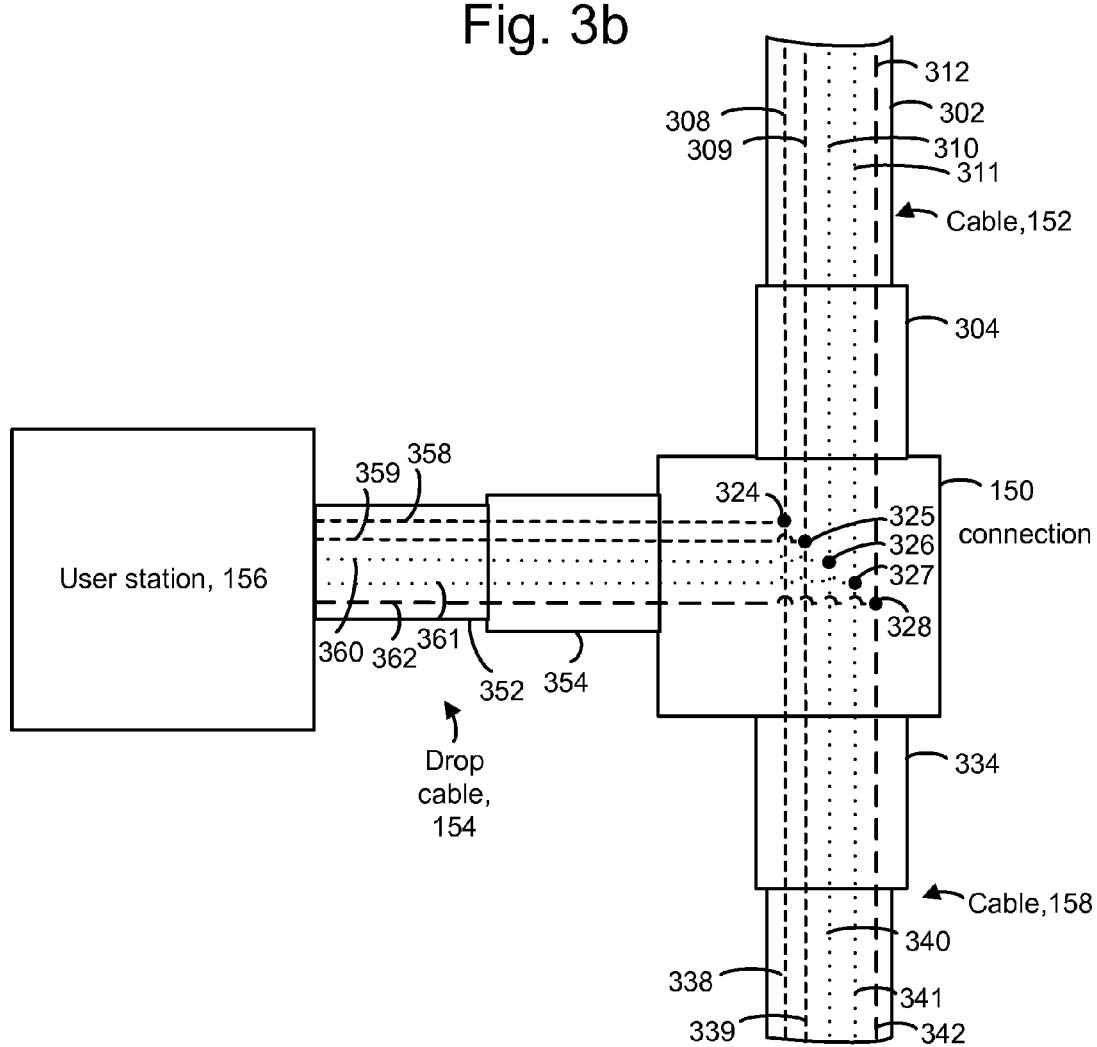

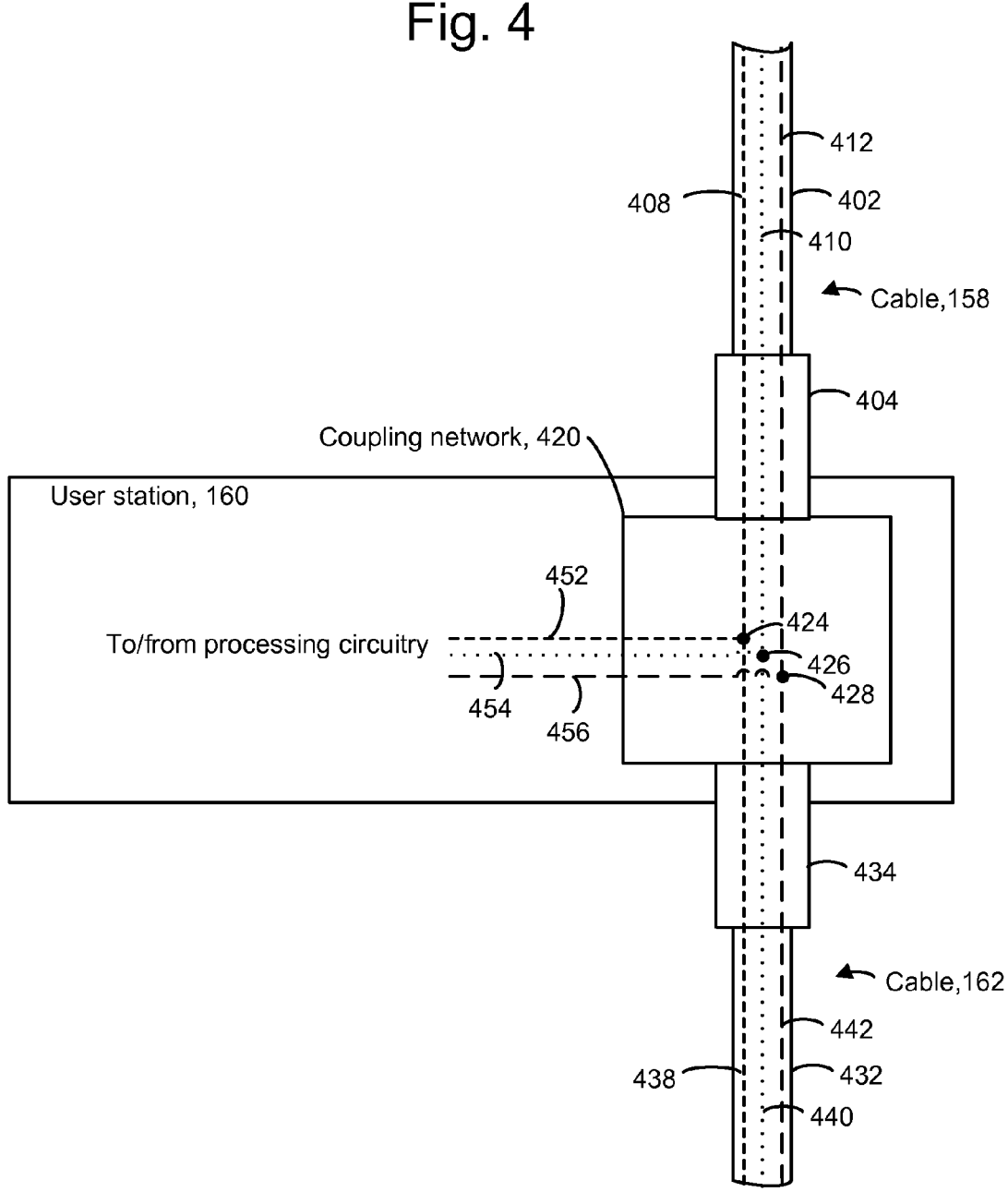

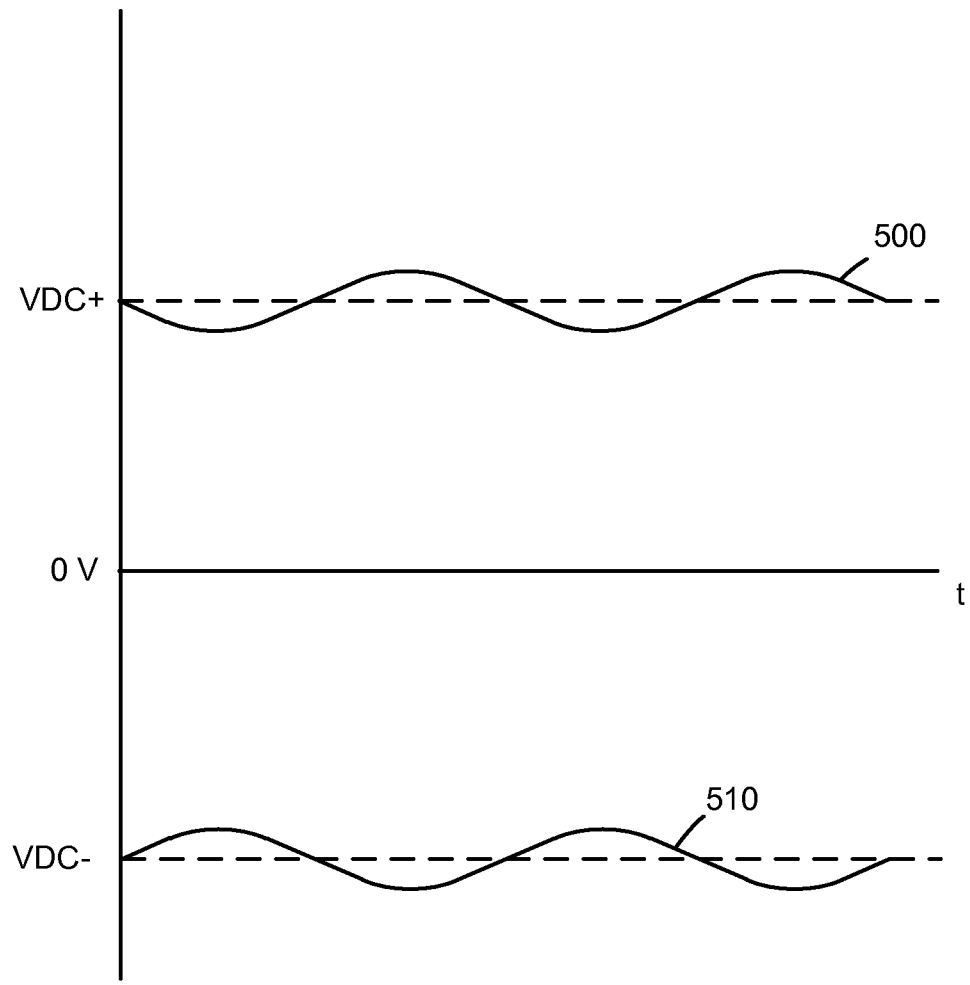

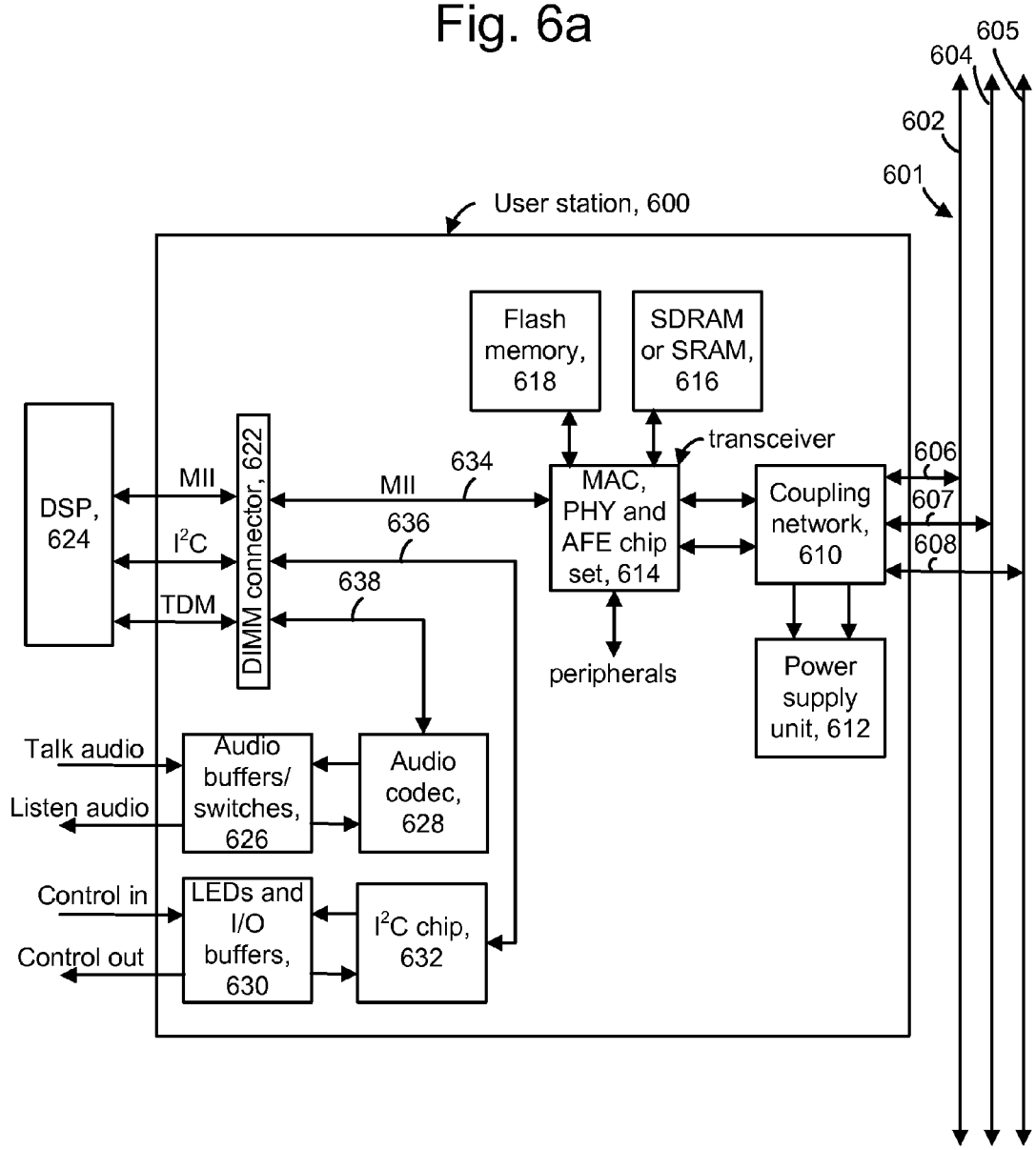

Fig. 9a
Routing table (session 1)
talker:   listeners:
IP2       IP2
IP3       IP4
Fig. 9b
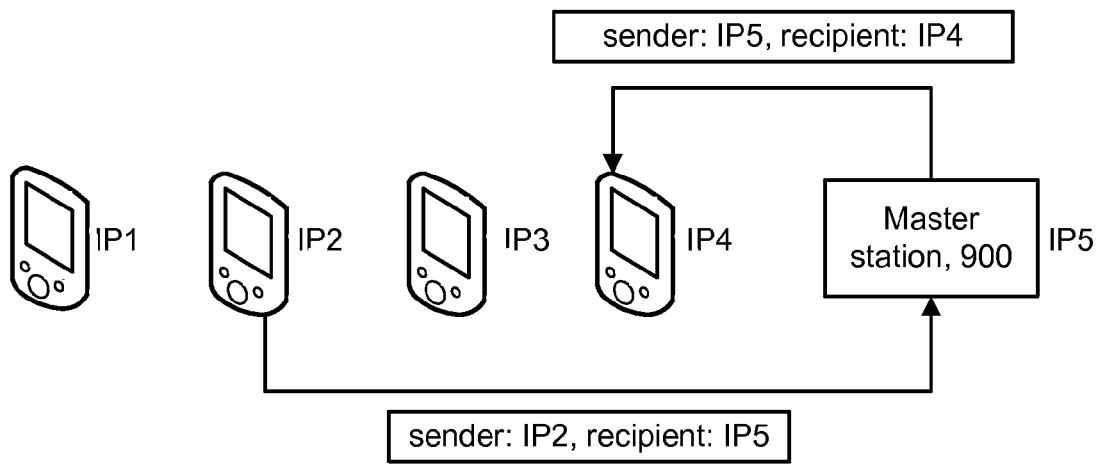
Fig. 9c
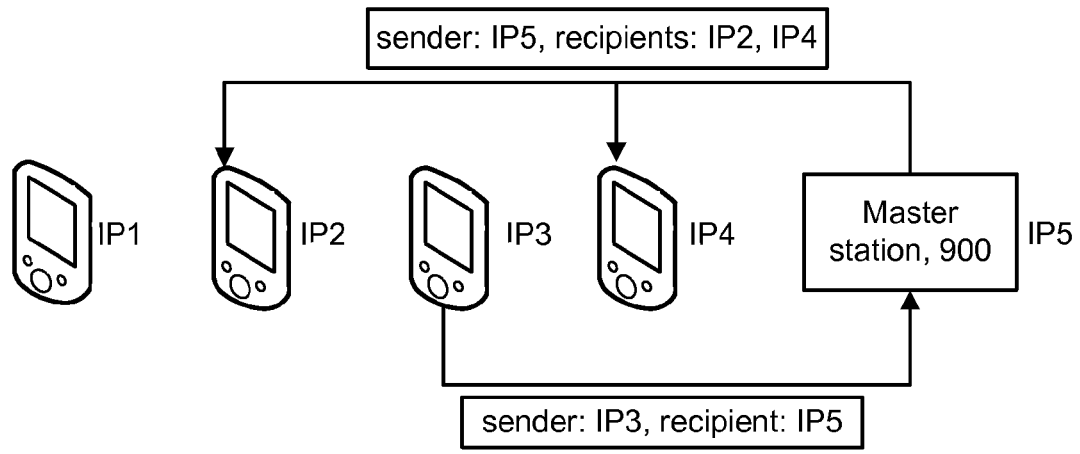

Routing table (session 2)
talker:   listeners:
IP3       IP1
          IP2
          IP4

User station 4

<u>unique identifier:</u>
IP4

<u>unique identifiers of other user stations for which it is a listener:</u>
IP1
IP2

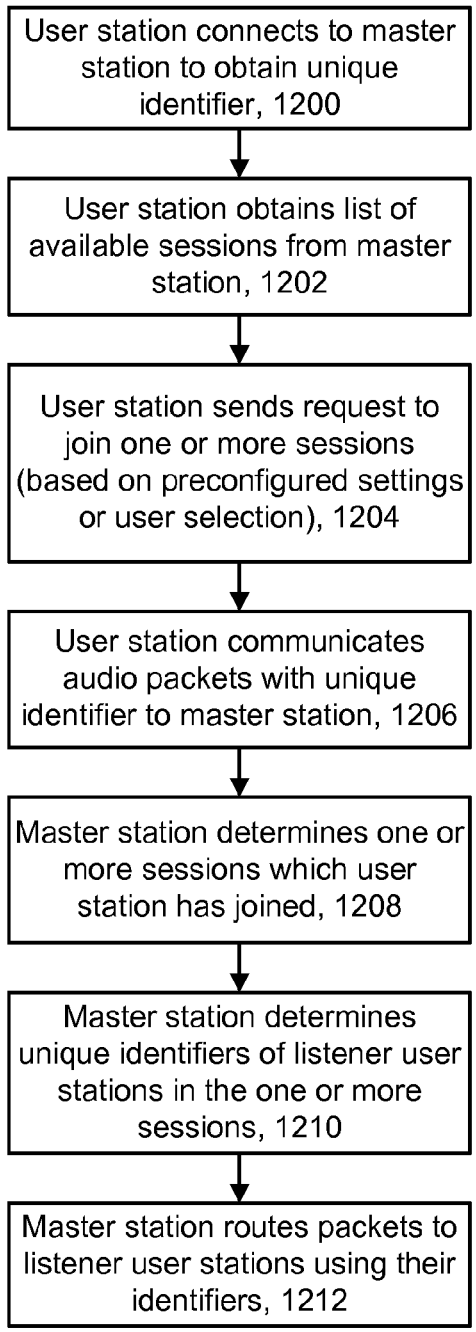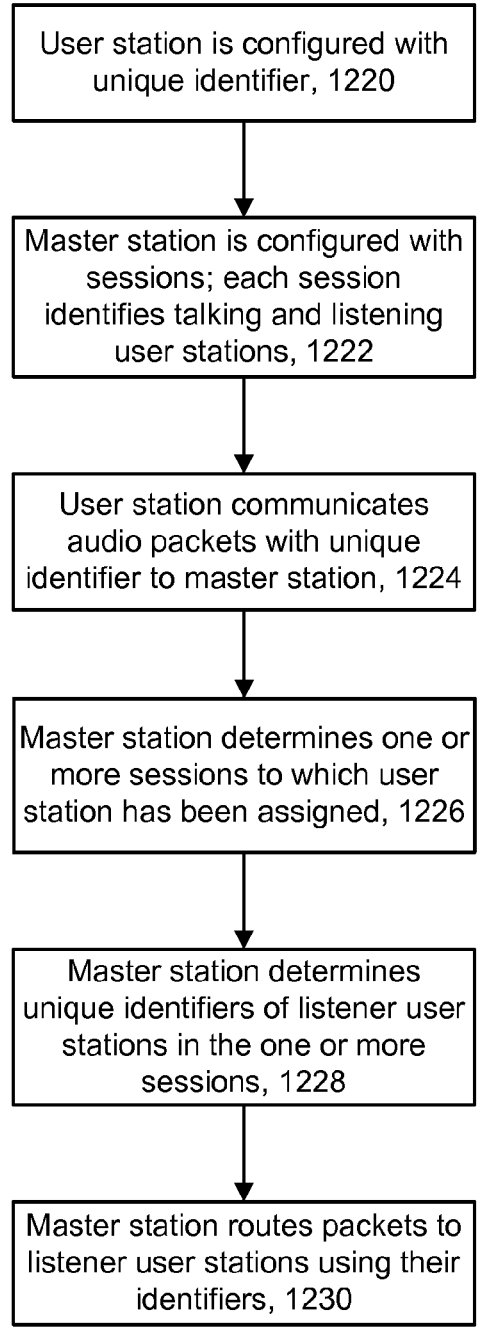

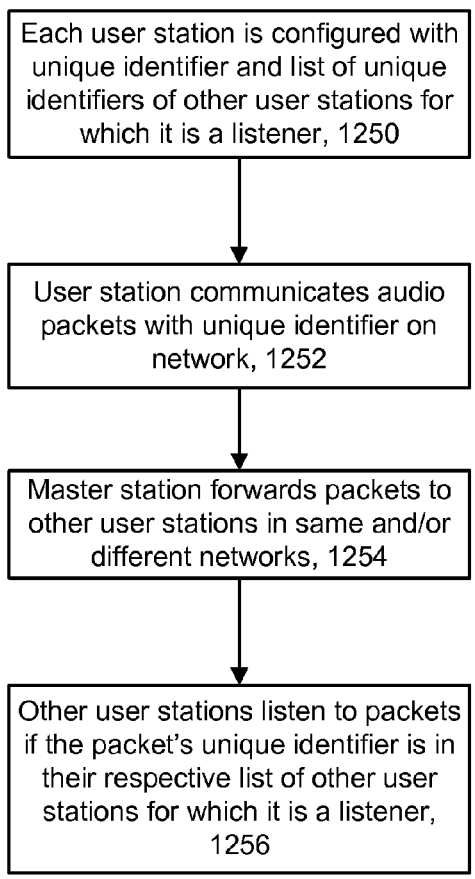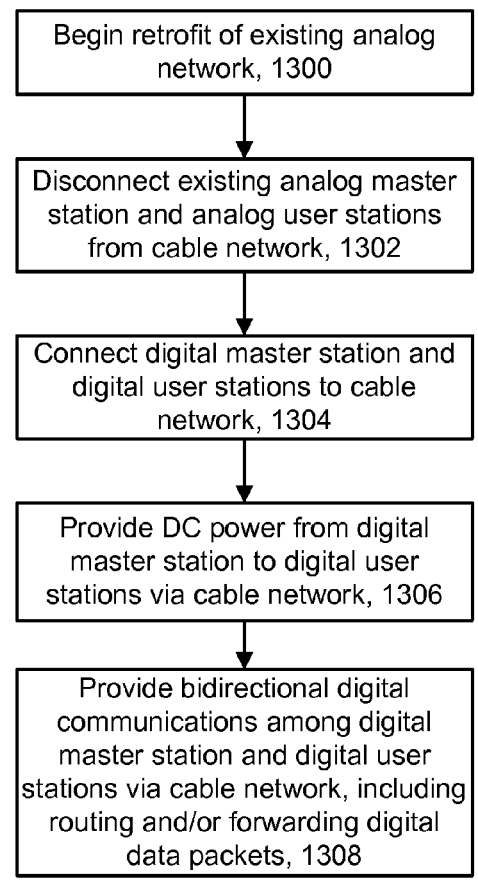

DIGITAL INTERCOM NETWORK OVER DC-POWERED MICROPHONE CABLE

BACKGROUND OF THE INVENTION

1. Field of the Invention

The present invention is directed to technology for an intercom network.

2. Description of the Related Art

Intercom systems are widely used in various venues to allow communications between users. For example, personnel at performing art venues such as theaters and concert halls, as well as television studios, sports events, houses of worship, and schools, often use intercom equipment to communicate with each other. The personnel talk to each other via portable user stations (e.g., belt-pack devices connected to a headset), which rely on a master station to control and power the intercom system.

Traditionally, intercom systems have used analog signaling over cabling to communicate voice and control data between user stations. A two-wire party line system utilizes two wires of a cable, such as a microphone cable, to allow users to listen concurrently to a single conversation. A four-wire matrix system utilizes a transmit pair and a receive pair for the audio to and from a user station to provide point-to-point communications. In practice, cables with six to eight wires may be used in an intercom system in which two or four wires carry data and the remaining four wires carry audio. In each case, an additional ground wire or shield is also typically provided.

Recently, digital intercom systems have been developed in which user stations are connected via computer networking components such as CAT-5 cable. CAT-5 cable is commonly used in a structured wiring system in which cables are installed in a building in a permanent manner. However, such digital intercom systems do not allow the easy retrofitting of existing analog intercom networks with digital equipment to provide full featured, multi-channel digital communications over existing cabling.

SUMMARY OF THE INVENTION

A digital intercom system is provided which includes multiple user stations connected to one or more master stations. The digital intercom system can be retrofitted to an existing analog intercom network or deployed in a new network.

In one embodiment, a digital intercom network includes a cable network having at least one cable. The at least one cable has first, second and third conductive paths, where the third conductive path is a ground path. The network further includes at least one user station connected to the first, second and third conductive paths. Further, a master station includes: (a) a DC power supply connected to the first, second and third conductive paths, where the DC power supply powers the at least one user station, (b) a transceiver which provides bidirectional digital communications in at least three channels via the first, second and third conductive paths, including transmitting digital signals concurrently via the first, second and third conductive paths, and receiving signals concurrently via the first, second and third conductive paths, and (c) a router in communication with the transceiver, where the router routes digital data packets in the at least three channels.

In another embodiment, a master station in a digital intercom network has a first connector which is connected to at least first, second and third conductive paths of at least one cable of the digital intercom network, where the third conductive path is a ground path. A DC power supply is connected to the at least first, second and third conductive paths via the first connector, where the DC power supply powers at least one user station which is connected to the at least one cable. A transceiver provides bidirectional digital communications with the user stations in at least three channels via the at least first, second and third conductive paths, including transmitting digital signals concurrently via the at least first, second and third conductive paths, and receiving signals concurrently via the at least first, second and third conductive paths. A router is in communication with the transceiver, where the router routes digital data packets in the at least three channels to provide digital point-to-point, digital point-to-multi-point, and digital party line communications among the user stations.

In another embodiment, a user station for use in a digital intercom network provided over at least one cable includes an interface to the at least one cable, where the at least one cable has at least first, second and third conductive paths, and the third conductive path is a ground path. A power conversion unit is associated with the interface for receiving DC power from the at least first, second and third conductive paths. A transceiver provides bidirectional digital communications via the at least first, second and third conductive paths, including transmitting digital signals concurrently via the at least first, second and third conductive paths, and receiving signals concurrently via the at least first, second and third conductive paths. The bidirectional digital communications are provided via at least one channel of at least three available channels which are provided over the at least first, second and third conductive paths.

In another embodiment, a method is provided for retrofitting an analog intercom network to provide a digital communication capability, where the analog intercom network includes user stations, an analog master station and a cable network having at least one cable. The at least one cable has first, second and third conductive paths, where the third conductive path is a ground path. The method includes disconnecting the analog user stations and the analog master station from the at least one cable, connecting digital user stations to the at least one cable in place of the analog user stations, and connecting a digital master station to the at least one cable in place of the analog master station. The digital master station: (a) provides DC power to the at least first, second and third conductive paths, the DC power is sufficient to power the user stations, and (b) provides bidirectional digital communications in at least three channels via the first, second and third conductive paths, including transmitting digital signals concurrently via the first, second and third conductive paths, and receiving signals concurrently via the first, second and third conductive paths, where the providing bidirectional digital communications includes routing digital data packets at the digital master station in the at least three channels to provide digital point-to-point, digital point-to-multi-point, and digital party line communications among the user stations according to respective network addresses of the user stations.

Corresponding methods, systems and computer- or processor-readable storage devices which have executable code for performing the methods provided herein may also be provided.

BRIEF DESCRIPTION OF THE DRAWINGS

FIG. 1a depicts exemplary digital intercom networks with respective master stations.

FIG. 2a depicts an exemplary three-conductor microphone cable which can be used in a digital intercom network to carry DC power and digital signals.

FIG. 2b depicts a cross sectional view of the cable shown in FIG. 2a.

FIG. 2c depicts an exemplary five-conductor microphone cable which can be used in a digital intercom network to carry DC power and digital signals.

FIG. 2d depicts a cross sectional view of the cable shown in FIG. 2c.

FIG. 3a depicts an exemplary connection which connects a three-conductor drop cable of a user station to a main cable.

FIG. 3b depicts an exemplary connection which connects a five-conductor drop cable of a user station to a main cable.

FIG. 4 depicts an exemplary daisy-chain connection of a cable to a user station.

FIG. 5 depicts exemplary differential mode signals.

FIG. 6a depicts an exemplary block diagram of one embodiment of a user station.

FIG. 8b depicts an exemplary block diagram of a power line interface of FIG. 8a.

FIG. 9a depicts an exemplary routing table, and FIGS. 9b and 9c depict routing of a packet between user stations using the routing table shown in FIG. 9a.

FIG. 10a depicts another exemplary routing table, and FIG. 10b depicts routing of a packet between user stations using the routing table shown in FIG. 10a.

FIG. 12a depicts an exemplary first process for selectively communicating data packets among user stations.

FIG. 12b depicts an exemplary second process for selectively communicating data packets among user stations.

FIG. 12c depicts an exemplary third process for selectively communicating data packets among user stations.

FIG. 13 depicts an exemplary process for retrofitting an analog intercom network to provide a digital communication capability.

DETAILED DESCRIPTION

Figure 1B:
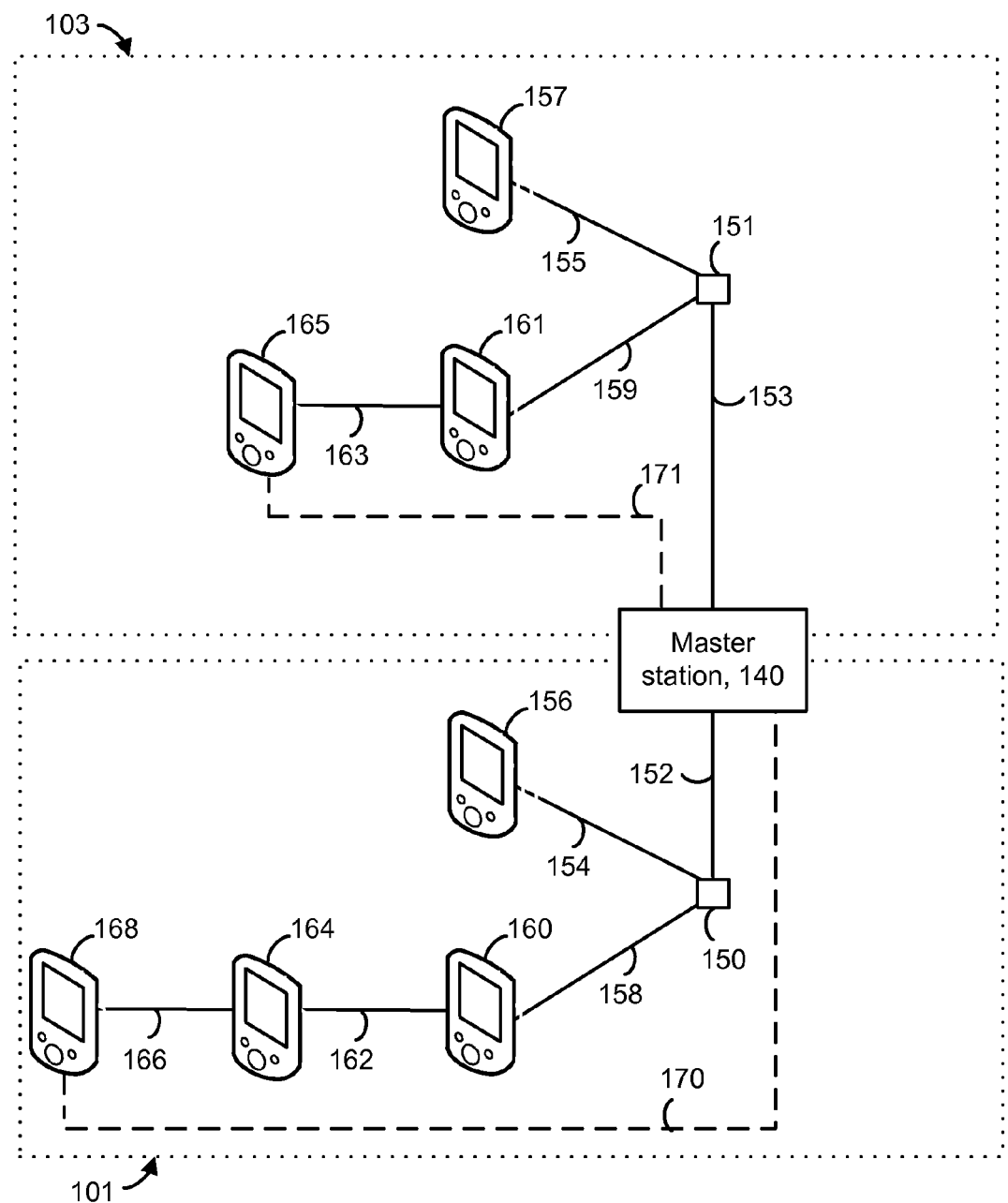
FIG. 1b depicts exemplary digital intercom networks served by a common master station.

The present invention provides a digital intercom system in which a master station provides DC power over a network to user stations connected to the network, and facilitates multi-channel digital communications among the user stations over the same twisted wire pair in a cable. In one embodiment, the network allows many separate channels of audio communications, along with control data and power, to be delivered to multiple user stations over a cable in a daisy-chain (series-connected) configuration. Further, user stations can easily and inexpensively be connected to the cable via a passive connection such as a Y- or T-connection.

The digital intercom system provided herein can mimic the analog party-line concept where all user stations (e.g., belt packs, remote stations, wall-mount stations, etc.) are 'com-moned' together along a single cable (typically XLR3 microphone cable) with each user station receiving its power and audio on this single cable. A basic party-line infrastructure might have all user stations connected via a daisy-chained configuration where the output of one user station is connected (such as by an XLR3 connector) to the input of the next user station and so on. However, in practice, the physical cabling is often routed within a venue's walls or through conduit, in which case users connect to the intercom system much like one would connect an electrical device to a power outlet.

The physical cabling is an important consideration when designing a party-line intercom system, but in both of the described cabling scenarios, all users are grouped in a 'party-line' call (where all users can talk/listen to all users). Multiple party-lines (channels: A, B, C . . . ) can operate simultaneously within a given intercom system in order to organize and isolate communications between functional groups (talent, stagehands, video/audio, etc.). Most live performance venues will cable the infrastructure so that all channels are available at bulkhead junction boxes spaced periodically throughout the facility; internal y-split cables ensure a closed circuit. The primary tenets of an analog party-line system are its robustness, reliability, ease of set-up, voltage and audio down the same cable, and relatively low cost.

A digital intercom system can replicate the desirable tenets of the analog party-line system while improving its shortcomings with digital transmission. In a digital intercom system herein, each user station is individually addressable. This removes the traditional party-line dependence of having the audio channel intimately related to its associated power line. Put another way, users can be physically connected in a daisy-chain fashion (User 1, 2, 3, . . . 10) along the same cable, yet could be grouped into different party-lines or function groups. This approach is expected to provide significant benefits to users by simplifying cable runs while maintaining communications flexibility similar to a point-to-point matrix intercom solution.

Moreover, the digital intercom system is simple to setup, re-configure and operate having a similar ease of installation of its analog counterpart, i.e., it is a "plug-and-play" solution which allows easy retrofitting of an existing analog intercom network. Any needed system configuration can be performed directly on the master station. A graphical user interface (GUI), which can be Internet browser-based, may be provided for system configuration, with standard communication ports located on the front of the master station to connect with a personal computer (PC) or personal digital assistant (PDA) via a common interface protocol such as USB.

The system may be fault tolerant such that the failure of a daisy-chained element (e.g., a user station is dropped/breaks/turned-off) should not affect the ability to communicate with other user stations connected to the network. That is, a physical pass-through function can be provided. Further, the platform can advantageously operate over standard single screened twisted pair microphone cable and can be tolerant to short circuits so that in the event of cable damage only the affected segment of the cable will lose the ability to transmit audio. Similarly, a cable break should only affect downstream elements. In some embodiments, the system can have an optional fly-back connection (an additional cable that allows a ring network to be formed) for power and data redundancy so that the system can continue to function in the event that the main cable is severed.

Individual user stations should be able to easily access any one of the multiple (predetermined) party-lines via a simple key and display which are selectable on the user station.

These functions should also be lockable to prevent communications errors from users inadvertently selecting the wrong party-line or accessing channels without permission.

FIG. 1a depicts exemplary digital intercom networks 100 and 101 with respective master stations 136 and 140, which have the above-mentioned features. The networks 100 and 101 are connected to one another, and can assume a variety of topologies and include multiple master stations and associated user stations and cable links. A basic topology includes a master station and a number of user stations which are connected by a cable network, and which communicate with one another via the master station. The master station and user stations are nodes in the network. For example, in the network 101, a master station 140 is connected to associated user stations 156, 160, 164 and 168. The master station is typically placed at a fixed location in a facility and receives power from the AC mains wiring of the facility. The AC power is converted to DC power and provided to the user stations. The master station 140 may optionally be manned by an operator who has the ability to talk and listen in the network, including communicating selectively with one or more user stations. Further, the master station 140 may communicate with a digital interface 142 to send and receive audio and other data to and from other networks. The user stations may be portable, user-worn devices, such as belt pack devices which allow a respective user to talk and listen to other users connected to the same network. The user stations include a microphone and speaker which may be built in or connected such as in a plug-in headset. Depending on configuration settings, the master station and each user station are able to talk to and/or listen to any other user in the system, either individually or in groups.

The master station 140 is connected to the user stations 160, 164 and 168 in a daisy-chained configuration. Specifically, the master station 140 is connected to the user station 160 via cable 152, connection 150 and cable 158. The user station 160 is connected to the user station 164 via a cable 162, and the user station 164 is connected to the user station 168 via a cable 166. Further, the master station 140 is connected to the user station 156 via a drop cable 154 and the connection 150, which essentially provides a passive Y- or T-connection which does not use active electronic components. The cables 152, 158, 162 and 166 form a primary branch of a cable network of the network 101. FIG. 1a illustrates an optional fly back cable 170 connecting the last user station 168 in the daisy-chain to the master station 140, forming a ring network topology between master station 140 and user stations 160, 164 and 168. A ring topology allows the master station 140 to deliver power to each of the user stations and communicate audio and other data, even in the event that one of the cables 152, 158, 162 and 166 becomes damaged or disconnected.

FIG. 1a indicates that the master station 140 may also communicate with a second master station 136 in a second network 100 via a line 138 such as a copper or fiber Ethernet connection. More than two master stations can be connected together in a system as well. For example, a fiber link can provide transmission for up to about 10 km, while a CAT-5 cable can provide transmission for about 100 m. Multiple master stations may be used in a large facility such as a sports stadium to provide sufficient coverage throughout the facility. The link 144 from the master station 140 to the digital interface 142 may similarly use a copper or fiber Ethernet connection.

FIG. 1a also indicates that a variety of network topologies may be used. In the network 100, the master station 136 communicates via a cable 132 with a passive bulkhead 122, which in turn communicates with a user station 106 via a drop cable 108 and a user station 102 via a cable 104. The passive bulkhead 122 provides a passive connection which does not use active electronic components. The passive bulkhead 122 is connected via a cable 124 to another passive bulkhead 126. User stations 110 and 112 are connected to bulkhead 126 via cable 120, connection 118 and cables 114 and 116. The passive bulkhead 126 is connected via a cable 128 to a wall-mount station 130, from which a fly back cable 134 returns to the master station 136 for redundancy.

The physical cabling can be routed freely within a venue, or routed within a venue's walls or through conduit, in which case users connect to the intercom system much like one would connect an electrical device to a power outlet. For example, user stations can be connected to drop cables which are plugged into junction boxes along a main cable line.

FIG. 1b depicts exemplary digital intercom networks served by a common master station. Here, the master station 140 serves both the network 101 and one or more additional networks, such as a network 103. The network 103 includes cables 153, 155, 159, 163 and 171, connection 151 and user stations 157, 161 and 165. The master station may have multiple pairs of XLR connectors in its back panel for connecting to the cables of the multiple networks, as discussed further in connection with FIG. 7a. Further, the internal processing and routing circuitry of the master station can allow digital communications among user stations in the same or different networks.

FIG. 2a depicts an exemplary three-conductor microphone cable 200 which can be used in a digital intercom network to carry DC power and digital signals. The microphone cable is a multi-conductor cable used in the intercom network, and can advantageously be of a type which is commonly used in analog intercom networks to allow easy retrofitting of such networks to provide a digital communications capability. For example, commonly used microphone cable includes three conductors: namely a first conductor "1" which connects to a ground shield, a second conductor "2" which is a positive DC voltage terminal and carries a positive or negative data signal on an associated wire, and a third conductor "3" which is a negative DC voltage terminal and carries a negative or positive data signal which is a mirror image of the positive or negative signal, respectively, on the second conductor. This is a differential mode transmission scheme, discussed further below in connection with FIG. 5. Thus, audio and control data can be carried via the first, second and third conductors. The first conductor provides a ground reference for the second and third conductors, so that voltages on the second and third conductors are defined with respect to the ground.

The cable 200 includes a main portion 202 and a connector 203. A common type of connector is an XLR connector which can have pins or sockets connected to two or more wires and a surrounding ground shield. The connector can be male or female, having pins or sockets 204, 206 and 208 named "1," "2" and "3," respectively.

The three-pin XLR connector (referred to as XLR3) is commonly used as a balanced audio connector for connections between microphones and audio equipment. EIA Standard RS-297-A describes the use of XLR3 for balanced audio signal applications. Other types of XLR connectors exist. A four-pin XLR cable is commonly used for intercoms and handsets, cameras and analog lighting control components. A five-pin XLR cable is commonly used for digital lighting control components, dual-element microphones and dual-channel intercom headsets. A six-pin XLR cable is commonly used for dual-channel intercom belt packs. Any of these types of XLR cables can be used for digital communications, although only two of the wires plus the ground shield are needed to provide digital communications among a set of devices using the techniques described herein. Conceivably, a first pair of wires can be used to provide digital communications among a first set of devices, and a second pair of wires can be used to provide digital communications among a different, second set of devices. Possibly, some devices can communicate over both pairs of wires. Additional pairs of wires could also be used for digital communications. Other wires may be used for other purposes. It is even possible to provide both digital and analog communications in the same cable.

In one implementation, digital communications among the user stations are provided using conductors/wires which are connected to pins "2" and "3." Other wires may be present in the cable but are not used for providing digital communications among the user stations, in this example. The three conductors are sufficient to provide several channels of bidirectional digital communications in a network, as well as providing DC power sufficient to power a number of user stations. The number of user stations that can be powered by a single master station depends on the power consumed by each user station and the supply power of the master station, as well as losses due to factors such as the cable gauge and length of the cable. In some embodiments, the master station may supply 60-96 W. For example, with a supply power of 60 W and 5 W used by each user station, up to twelve user stations can be powered (ignoring cable losses). In contrast, other approaches such as Power over Ethernet (PoE) power a single device and do not allow powering multiple devices from a common power supply node and signal path.

FIG. 2b depicts a cross sectional view of the cable shown in FIG. 2a. The basic construction of a cable for low-impedance microphone or balanced line applications is the shielded twisted pair. Such a cable includes signal- and power-carrying copper conductors 213 and 215 as respective wires which are insulated by insulation 207 and 209, respectively, and twisted together in a filler 214. Conductor 213 is connected to pin 206, and conductor 215 is connected to pin 208. A copper ground shield 212 is connected to the ground conductor 204. The shield acts as a shield to RF interference as well as serving as a ground reference. An outer jacket 210 surrounds the copper ground shield 212.

FIG. 2c depicts an exemplary five-conductor microphone cable which can be used in a digital intercom network to carry DC power and digital signals. In an alternative approach, auxiliary conductors are provided so that power and signals are carried over five or more conductive paths. This allows power to be delivered over a longer cable. For example, in a cable 250 with a cable portion 251, a connector 252, and pins or sockets 253-257, pin "1" 253 can be the ground path, pins "2" and "3" can be connected to the positive DC voltage terminal of the power supply, and pins "4" and "5" can be connected to the negative DC voltage terminal of the power supply.

FIG. 2d depicts a cross sectional view of the cable shown in FIG. 2c. The cable portion 251 includes copper conductors 266, 264, 269 and 262 as respective wires which are insulated by insulation 267, 265, 270 and 263, respectively, and provided in a filler 261. In one approach, the conductors associated with pins "2" and "4" can be a twisted pair, and the conductors associated with pins "3" and "3" can be another twisted pair. Conductor 266 is connected to pin 254, conductor 264 is connected to pin 255, conductor 269 is connected to pin 256, and conductor 262 is connected to pin 257. A copper ground shield 268 is connected to the ground conductor 253. An outer jacket 271 surrounds the copper ground shield.

FIG. 3a depicts an exemplary connection which connects a three-conductor drop cable 154 of a user station 156 to a main cable line, which includes cables 152 and 158. As mentioned previously in connection with FIG. 1a, connections such as 118 and 150 can be used to connect a drop cable or spur to a main cable line. Advantageously, such connections are passive and do not use active electronics such as a transceiver (transmitter/receiver) or repeater. In contrast, conventional Ethernet communications such as over CAT-5 cable use point-to-point links which extend between active electronic devices such as hubs, switches, routers or computers. Such communications do not both transmit and receive using the same conductor, but have a dedicated transmit pair and a receive pair. Significant cost savings and flexibility are realized by avoiding the need for active electronic devices.

The cables 152 and 158 of FIG. 1a, which are part of a main branch or line of the cable network 101, are connected via the connection 150, such as by XLR connectors. The drop cable 154 allows the user station 156 to tap into the signal and power carried by the cables 152 and 158, and may also use an XLR connector. In FIG. 3a, the cable 152 includes a cable portion 302 and a connector 304, the cable 158 includes a cable portion 332 and a connector 334, and the drop cable 154 includes a cable portion 352 and a connector 354. Moreover, the cable 152 includes conductive paths 308, 310 and 312 which correspond to conductors 206, 208 and 204, respectively, of FIG. 2a. Similarly, the cable 158 includes conductive paths 338, 340 and 342 which correspond to conductors 206, 208 and 204, respectively, of FIG. 2a, and the drop cable 154 includes conductive paths 358, 360 and 362 which correspond to conductors 206, 208 and 204, respectively, of FIG. 2a. Conductive paths 308 and 338 join to form a continuous conductive path through multiple able portions, as do conductive paths 310 and 340, and 312 and 342. In the connection 150, the conductive paths 308, 338 and 358 are electrically connected to a connection point 324, the conductive paths 310, 340 and 360 are electrically connected to a connection point 326, and the conductive paths 312, 342 and 362 are electrically connected to a connection point 328.

As a result, the power and signal provided by the master station are provided on the drop cable, so that the user station 156 can receive power and digital communication signals via the drop cable 154. Similarly, a digital communication signal transmitted by the user station 156 on the drop cable is provided on the cables 152 and 158, so that the master station and other user stations can receive a signal from the user station 156.

FIG. 3b depicts an exemplary connection which connects a five-conductor drop cable of a user station to a main cable. The user station can obtain power and transmit and receive digital signals via five (or more) conductive paths in a cable. This allows power to be delivered over a longer cable. The like numbered elements of FIG. 3b are repeated here. The cables used in this embodiment correspond to those in FIGS. 2c and 2d. Cable 152 includes an auxiliary conductive path 309 to the conductive path 308, and an auxiliary conductive path 311 to the conductive path 310. Cable 158 includes an auxiliary conductive path 339 to the conductive path 338, and an auxiliary conductive path 341 to the conductive path 340. Drop cable 154 includes an auxiliary conductive path 359 to the conductive path 358, and an auxiliary conductive path 361 to the conductive path 360. Connection point 325 connects the conductive paths 309, 339 and 359. Connection point 327 connects the conductive paths 311, 341 and 361. The other conductive paths are connected as described in connection with FIG. 3a.

FIG. 4 depicts an exemplary daisy-chain connection of a cable to a user station. The cables 158 and 162, and user station 160, of FIG. 1*a* are depicted in further detail. In this case, the cables may be plugged into corresponding connectors, such as XLR connectors, in the user station 160. The cable 158 includes a cable portion 402, a connector 404, and conductors 408, 410 and 412 which correspond to conductors 206, 208 and 204, respectively, of FIG. 2*a*. The cable 162 includes a cable portion 432, a connector 434, and conductors 438, 440 and 442 which correspond to conductors 206, 208 and 204, respectively, of FIG. 2*a*. A coupling network or component 420 in the user station 160 includes connection points 424, 426 and 428 to which conductors 452, 454 and 456 in the user station 160 are electrically connected to the corresponding conductors in the cables 158 and 162. The conductors 452, 454 and 456 lead to processing circuitry in the user station 160.

FIG. 5 depicts exemplary differential mode signals. As mentioned, a positive DC voltage terminal of a power supply can be connected to one wire in a cable, and a negative DC voltage terminal of the power supply can be connected to another wire in the cable. Further, a positive or negative voltage data signal can be provided in either wire. When a positive voltage signal is provided in one wire, a mirror image negative voltage signal is provided in the other wire. This is a differential or balanced mode transmission scheme. For example, a positive DC voltage, VDC+, of +30 V, may be used in conjunction with a negative DC voltage, VDC−, of −30 V. Thus, the potentials are equal in magnitude but opposite in polarity. Further, the supply voltages are modulated so that the magnitude varies with time to represent voice and other data. These time-varying signals are represented by waveforms 500 and 510, which are equal in magnitude but opposite in polarity. For example, in a three-conductor cable, the waveform 500 can be carried by the conductor associated with pin "2" in FIG. 2*a*, and the waveform 510 can be carried by the conductor associated with pin "3" in FIG. 2*a*. In a five-conductor cable, the waveform 500 can be carried by the conductors associated with pins "2" and "3" in FIG. 2*c*, and the waveform 510 can be carried by the conductors associated with pins "4" and "5" in FIG. 2*c*. A difference between the waveforms 500 and 510 represents voice and control data which is carried via the cable. In practice, digital signals of about 1-2 V can be carried atop a DC power rail of 30-60 V. Other levels can be used as well.

Both conductors (pins "2" and "3"), or both sets of conductors (a set with pins "2" and "3", and a set with pins "4" and "5"), carry the DC power with balanced data superimposed, such that the information-carrying signal is represented by the difference between the two waveforms. For example, waveforms at +30 V and −30 V at one point in time result in a signal of +60 V, and waveforms at +31 V and −31 V at another point in time result in a signal of +62 V.

FIG. 6*a* depicts an exemplary block diagram of one embodiment of a user station 600 (corresponding, e.g., to user station 160 in FIG. 1*a*). A user station can be portable and user-worn or carried, such as on a belt pack, or non-portable, such as in a console mount, rack mount, desk mount or wall mount. A portable user station can include a connector to a headset. A user station 600 provided herein advantageously has the ability to participate in a digital intercom network which supports multiple channels (e.g., three or more channels) to provide digital point-to-point, digital point-to-multipoint, and digital party line communications. In particular, the user station includes circuitry which allows it to send and receive digital data packets, as well as to draw DC power, from the same set of conductors.

The user station shown in FIG. 6*a* allows a user to communicate with any other user/channel/subgroup connected to the digital intercom network. The user station is individually addressable according to a unique address/identifier associated with the user station, and allows point-to-point communication as well as conventional party-line operation. The user station has a set of controls which allow the user to select a channel. Although, a lockout feature may be implemented to prevent users from changing/selecting any pre-set configurations of the user station, including the ability to select channels. The user station has the simplicity of operation experienced by users of analog user stations but can achieve improved audio performance and flexibility including multi-channel access.

In particular, the signal- and power-carrying conductors 602, 604 and 605 of a cable 601 are accessed via conductive paths 606, 607 and 608, respectively, by a coupling network 610. The coupling network 610 provides line driving and transient protection. A power supply unit 612 is connected to the coupling network 610 to access the DC power which is carried by the cable 601. The power supply unit 612 typically transforms the voltage, e.g., 30-60 V DC, to lower levels which may be required by the circuitry of the user station 600. Note that the user station 600 can be used for both portable and non-portable devices. However, the electrical load to a non-portable station such as a wall-mount speaker station and/or a desktop speaker station will be different than that of a portable station such as a belt pack due to the different microphone and speaker. Further, a wall-mount or desktop speaker station may be locally powered, in which case a user station does not need to draw power from the cable 601 to operate.

In one possible implementation, a chipset 614 implements the Medium Access Control (MAC) layer and the Physical (PHY) layers of the International Organization for Standardization/Open System Interconnect (ISO/OSI) stack. These are the bottom two layers of the stack. The chipset 614 is a transceiver as it sends and receives signals on the network. Specifically, the transceiver provides bidirectional digital communications in at least three channels via the first, second and third conductive paths 602, 604 and 605, including transmitting digital signals concurrently via the first, second and third conductive paths, and receiving signals concurrently via the first, second and third conductive paths. The transmitting and receiving can occur concurrently with respect to one another, or at different times.

The MAC layer interfaces with the PHY layer through a Medium-Independent Interface (MII). A typical 10/100 PHY Ethernet implementation incorporates separate 10BaseT and 100BaseTX interfaces. Further details are provided in FIG. 6*d*. The chipset 614 also provides an Analog Front End (AFE) which provides a tuner and analog-to-digital converter (ADC). The chipset 614 can incorporate a microcontroller, Ethernet MAC, and PHY. An example of such a chip set is the INT6400 256 LFBGA (Low-Profile Fine-Pitch Ball Grid Array) package available from INTELLON CORPORATION, Orlando, Fla., USA. This chip is suitable for communicating over AC power lines using the HomePlug AV standard for home networking of computers. It is optimized for multi-media streaming applications and is fully compliant with the HomePlug AV standard with 200 Mbps PHY-rate over power line wiring.

The chipset 614 can include a complete HomePlug AV MAC and PHY, an Ethernet MII, an external SDRAM (synchronous dynamic random access memory) interface, along with interfaces for two external SPI (serial peripheral interface) devices. The chipset 614 can also include the INTELLON i60 Line Driver IC.

In further detail, the PHY provides 200 Mbps OFDM@ 1024-QAM, and supports 1024/256/64/16/8-QAM, QPSK, BPSK and ROBO Modulation Schemes. The PHY uses 128-bit AES Link Encryption with key management for secure powerline communications. Windowed Orthogonal Frequency Division Multiplexing (OFDM) with noise mitigation improves data integrity in noisy conditions. Moreover, dynamic channel adaptation and channel estimation maximizes throughput in harsh channel conditions. Finally, Advanced Turbo Code Forward Error Correction is used. The MAC provides integrated Quality of Service (QoS) features such as contention-free access, four-level priority-based contention access, and multi-segment bursting. The MAC also provides Type of Service (ToS), Class of Service (CoS) and Internet Protocol (IP) port number packet classifiers, and supports Internet Group Management Protocol (IGMP) managed multicast sessions. IGMP is a communications protocol used to manage the membership of Internet Protocol multicast groups. IGMP is used by IP hosts and adjacent multicast routers to establish multicast group memberships.

Peripherals of the chipset 614 can include a General-Purpose Input/Output (GPIO), 32 bit Peripheral Component Interconnect Express version 2.2 (PCI2.2), MPEG Transport Stream (TS) Serial interface and JTAG test/In-Circuit Emulator (ICE) port.

The user station may also have a USB port to receive configuration commands from a computer when the particular user station is being configured, e.g., with a network address or group or session information which determines which user stations the particular user station can communicate with.

The chipset 614 may access flash memory 618 and a SDRAM or SRAM 616. The chipset 614 further communicates with a Digital Signal Processor (DSP) 624 via a path 634 and a Dual Inline Memory Module (DIMM) connector 622. The DSP can be provided as a card, as shown, or fitted directly to a printed circuit board (PCB). The path 634 is connected to a reverse MII interface to the Ethernet MAC of the chipset 614. The DSP 624 routes audio and control data which are received at the user station 600 from the cable, or generated at the user station for transmission on the cable 601. Specifically, the DSP 624 sends (via path 636) control data to and receives control data from, an Inter-Integrated Circuit (I²C) chip 632, which in turn communicates with LEDs and I/O buffers 630 to receive and send control data. The DSP 624 also sends (via path 638) digital audio to and receives digital audio from an audio codec 628, which in turn communicates with audio buffers/switches 626 to receive talk audio from a microphone and send listen audio to a speaker. The codec (coder/decoder) 628 provides analog-to-digital conversion of talk audio and digital-to-analog conversion of listen audio. It is also possible to fit separate ADCs and DACs in place of the codec. The DSP 624 may use time-division multiplexing (TDM) in communicating with the audio codec 628.

Figure 6B:
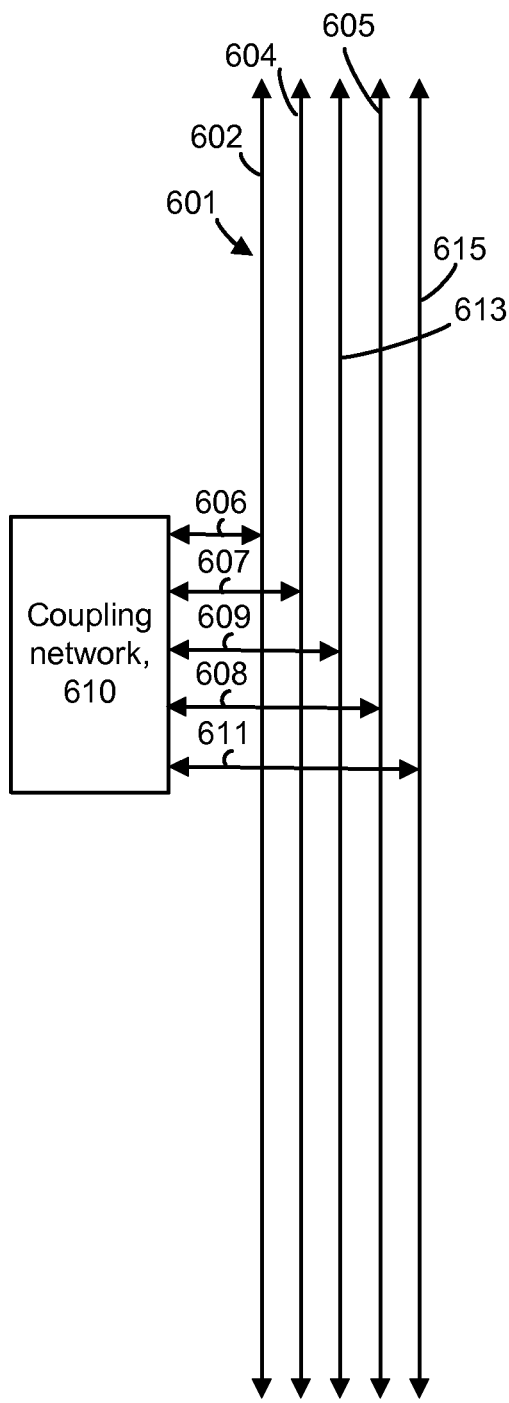
FIG. 6b shows a coupling network of a user station or master station connecting to a five-conductor cable.

FIG. 6*b* shows a coupling network of a user station or master station connecting to a five-wire cable. The coupling network 610 of FIG. 6*a* may connect to a five-conductor cable as an alternative to a three-conductor cable. In this configuration, auxiliary signal- and power-carrying conductors 613 and 615 are provided in the cable 601, in addition to the conductors 602, 604 and 605. The auxiliary conductors 613 and 615 are accessed via conductive paths 609 and 611, respectively, by the coupling network 610. A similar approach can be used for a coupling network of a master station.

The chip set 614 as a transceiver provides bidirectional digital communications using one signal on both a first conductive path 604 and its auxiliary conductive path 613, and another signal on both a second conductive path 605 and its auxiliary conductive path 615.

Figure 6C:
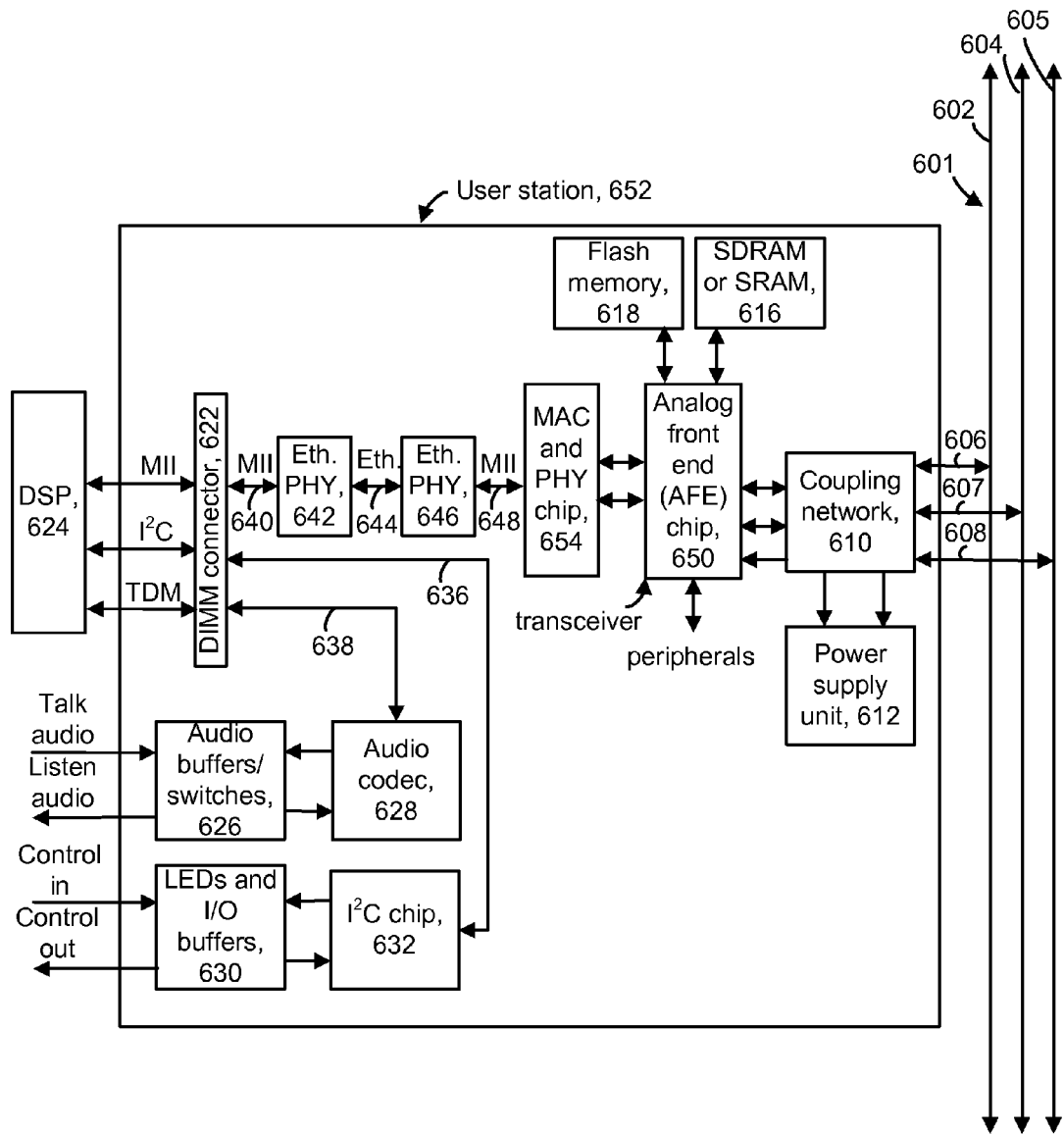
FIG. 6c depicts an exemplary block diagram of another embodiment of a user station.

FIG. 6*c* depicts an exemplary block diagram of another embodiment of a user station (corresponding, e.g., to user station 160 in FIG. 1*a*). In this implementation of a user station 652, the analog front end functionality is separated out to an AFE chip 650 which works with a MAC and PHY chip 654. The chip 654 does not include a reverse MII interface to the Ethernet MAC. Instead, two Ethernet PHY chips 642 and 646 are used to communicate audio and control data between the DSP 624 and the chip 654. In particular, the chip 654 communicates via a MII on line 648 with Ethernet PHY chip 646, the Ethernet PHY chip 646 communicates with the Ethernet PHY chip 642 using Ethernet on line 644, and the Ethernet PHY chip 642 communicates with the DSP 624 via a MII on line 640. An example of the chip 654 is the SPC200e in a 512 Enhanced Plastic Ball Grid Array (EPBGA) package available from SPIDCOM TECHNOLOGIES S.A., Bourg La Reine, France. The SPC200e has been used for in-home broadband communication over electrical power lines and coaxial cables, such as for Internet and VoIP, Video on Demand, IPTV, and whole in-house HDTV. The SPC200e does not require a zero crossing reference.

An example of the AFE 650 is the AD9865, available from ANALOG DEVICES, INC., Norwood, Mass., USA. The AD9865 is a mixed-signal front end IC for transceiver applications requiring Tx and Rx path functionality. Thus, the AFE 650 includes a transceiver. An alternative for the chip 654 is the CG3111, with the CG3112 for the chip 650, both available from COPPERGATE COMMUNICATIONS, INC., Newark, Calif., USA. This approach requires two Ethernet PHYs or a reverse MII. Another alternative for the chip 654 is the DSS9101, with the DSS78002 for the chip 650, both available from DS2, Valencia, Spain. This approach has a reverse MII interface to the Ethernet MAC and therefore does not require two Ethernet PHYs.

Figure 6D:
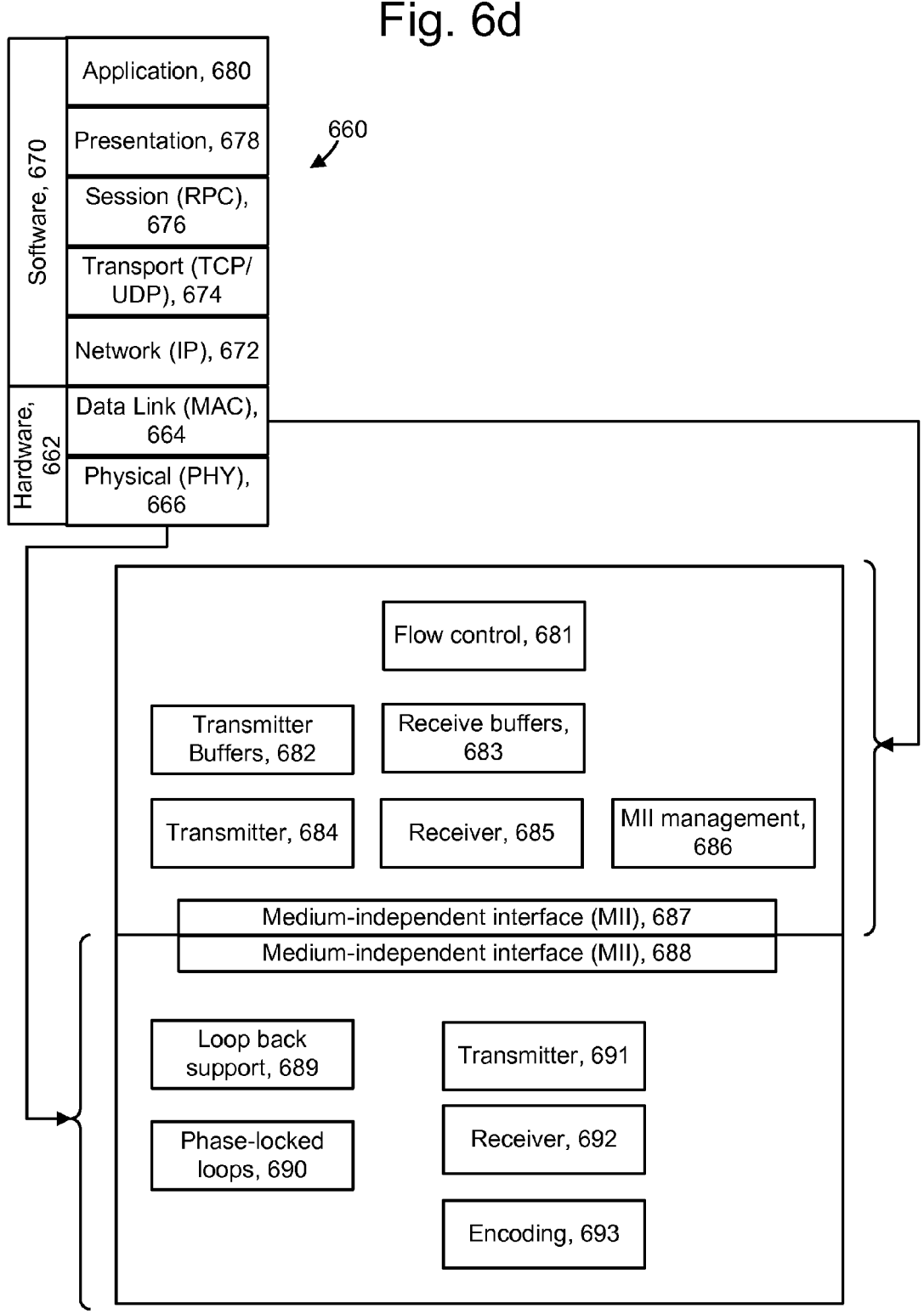
FIG. 6d depicts the Ethernet MAC and PHY layers of the OSI protocol stack.

FIG. 6*d* depicts the Ethernet MAC and PHY layers of the OSI protocol stack. As mentioned, one possible technique for digital communication in an intercom network uses Ethernet MAC and PHY to implement the bottom two layers of the ISO/OSI stack. The stack 660 includes a hardware layer 662, including a physical (PHY) layer 666 and a data link layer 664 which may use media access control (MAC). Software layers 670 include a network layer 672 which may use the Internet Protocol (IP), a transport layer 674 which may use the Transmission Control Protocol (TCP) or User Datagram Protocol (UDP), a session layer 676 which may use a Remote Procedure Call (RPC) protocol, a presentation layer 678 and an application layer 680

In further detail, the data link layer 664 includes a transmitter component 684 and receiver component 685 and associated buffers 682 and 683, respectively. A flow control component 681 and a MII management component 686 are also provided. The MII 687 of the data link layer interfaces with the MII 688 of the physical layer. The physical layer also includes a transmitter component 691 and receiver component 692, in addition to an encoding component 693, loop back support 689 and phase-locked loops 690. A typical 10/100 PHY Ethernet implementation incorporates separate 10BaseT and 100BaseTX interfaces, where 10BaseT uses Manchester encoding, and 100BaseTX uses 4B/5B encoding.

The Ethernet standard is defined by IEEE 802.3. The Ethernet MAC implements a data-link layer, supporting operation at both 10 Mbits/s and 100 Mbits/s. The standard typically implements the MII, also defined in IEEE 802.3. It includes a data interface and a management interface between the MAC and the PHY. The data interface includes a channel for the transmitter 684 and a separate channel for the receiver 685. Each channel has its own clock, data, and control signals. With the management component 686, upper layers can monitor and control the PHY. The PHY is the physical interface transceiver and implements the physical layer.

Figure 7A:
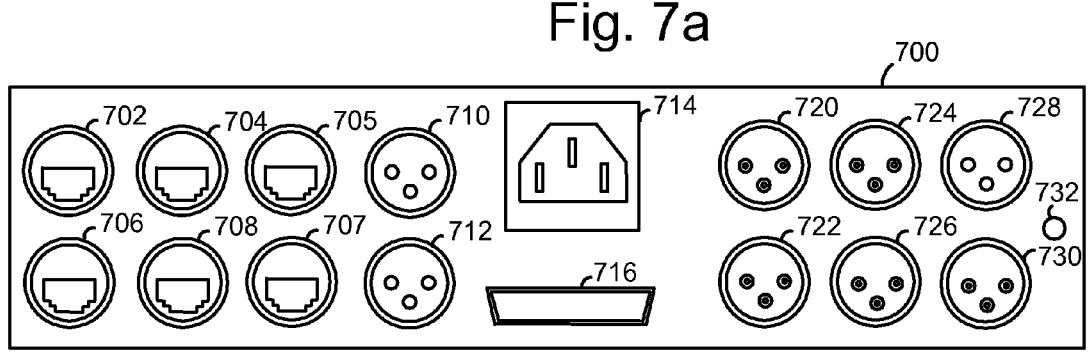
FIG. 7a depicts an exemplary back panel of a digital master station.

FIG. 7*a* depicts an exemplary back panel 700 of a digital master station (corresponding, e.g., to master station 140 in FIG. 1*a*). The back panel 700 includes a number of connectors for audio, control data and power. The particular connectors depicted, along with their number and placement on the master station, are examples only and are not intended to limit the scope of the technology described herein. In one approach, both digital and audio networks can communicate with one another via the master station. The connectors can include a pair of RJ45 sockets 702 and 704 for 100/10 BaseT Ethernet communications such as might be used for the path 138 between the master stations 136 and 140 in FIG. 1*a*. A pair of 4-wire RJ45 sockets 706 and 708 provides an interface to two 4-wire audio circuits, such as for communicating via CAT-5e or CAT-6 cable. RJ45 connectors 705 and 707, or, alternatively, fiber optic connectors, can be used for communications with other remote devices. A pair of three-pin female XLR connectors 710 and 712 can be used for an analog party line option.

A power socket 714 receives main power such as at 100-240 V, with an input frequency range of 50-60 Hz. A GPIO connector 716 allows connection of switch inputs (e.g., a footswitch to operate front panel controls instead of pressing a front panel button) and relay outputs (e.g., to turn on a light or close a door at the press of a front panel button).

Either of connectors 720 and 724 may be used individually or as a pair to provide DC power and digital communications as described herein on a main cable power line in a digital intercom network. The connectors 720 and 724 are three-pin male XLR connectors, in one possible approach. For example, the connector 720 may connect to one end of a cable or series of cables while the connector 724 connects to the other end of the cable or series of cables, to provide a ring topology with redundancy, e.g., as shown in networks 100 and 101 of FIG. 1*a*. The connector 720 may be a first connector which is connected to one end of at least one cable, while the connector 724 may be a second connector which is connected the other end of the at least one cable, to form a closed ring. For example, in the network 101 of FIG. 1*a* or 1*b*, the first connector 720 can connect to the cable 152 and the second connector 724 can connect to the cable 170. DC power and digital communications can be provided via each connector 720 and 724. Similarly, an additional pair of connectors 722 and 726 may be used to provide DC power and digital communications data on an additional cable network ring. For example, in the network 103 of FIG. 1*b*, the connector 722 can connect to the cable 153 and the connector 726 can connect to the cable 171. The two rings may communicate with one another via a switch in the master station, discussed below in connection with FIG. 8*a*. The back panel 700 further includes a stage announce/public address output 728, a program input 730 for monitoring a program source and a hot mic output 732.

Figure 7B:
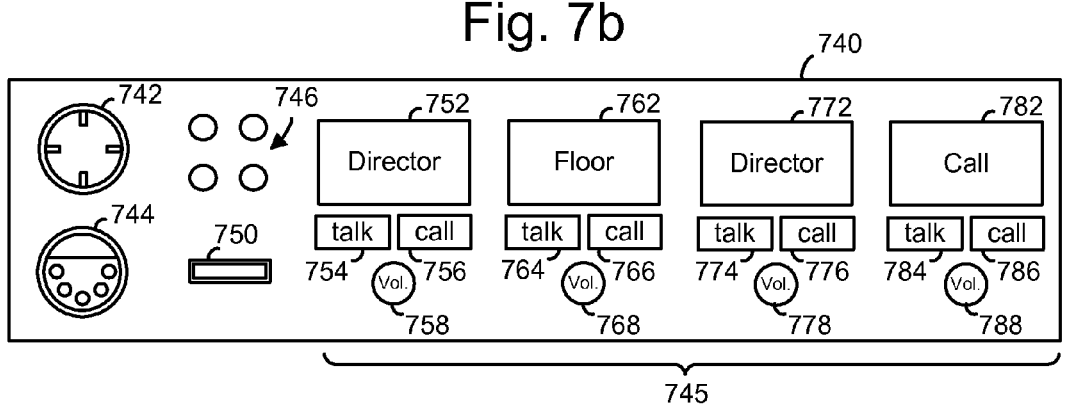
FIG. 7b depicts an exemplary front panel of a digital master station.

FIG. 7*b* depicts an exemplary front panel 740 of a digital master station. The front panel 740 includes displays and controls which assist an operator in controlling the digital intercom network. A headset output connector 742 and microphone input connector 744 are provided. A USB connector 750 (standard, micro and/or mini) provides connectivity to a computer which provides a GUI regarding a master station status, and to receive configuration commands. A set of user interface elements such as buttons 746 provide additional controls such as mic on-off, headset select, talk to announcer, remote mic kill, all talk, loudspeaker/headphone level and program sound level. A set of keysets 745 are also provided. Each keyset has a display (752, 762, 772, 782) to inform the operator of a currently selected user station or group of user stations being monitored, a talk button (754, 764, 774, 784), a call button (756, 766, 776, 786) and a volume control (758, 768, 778, 788).

Figure 8A:
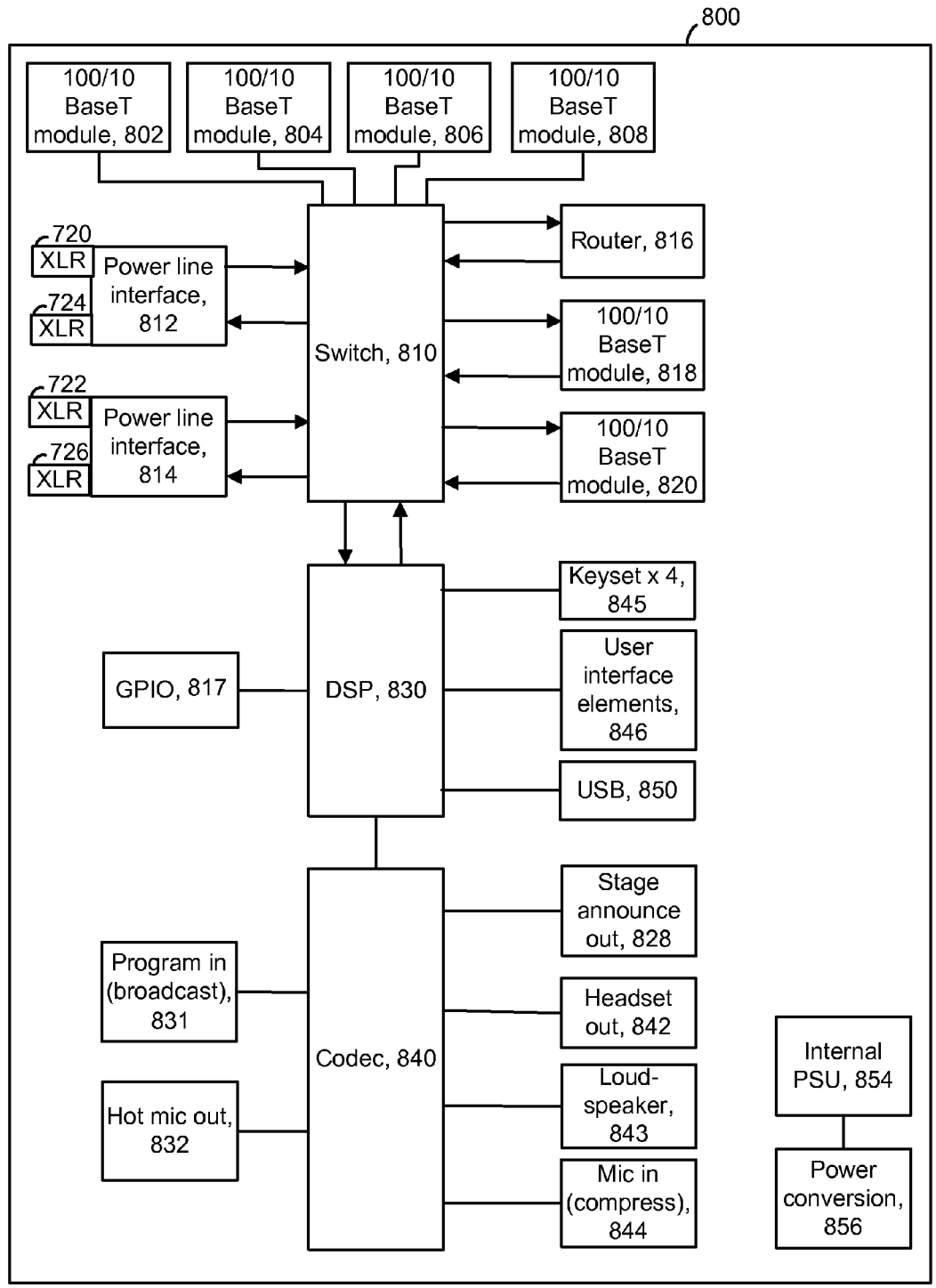
FIG. 8a depicts an exemplary block diagram of a digital master station.

FIG. 8*a* depicts an exemplary block diagram of a digital master station. The digital master station 800 serves as a central hub to coordinate the communication of digital packets among the user stations, in addition to providing DC power to the user stations. The circuitry of the master station may be provided on one or more printed circuit boards within a housing. In an example implementation, a switch 810 such as 8-port Fast Ethernet and 2-port MII switch 810 coordinates the movement of data among different components of the master station. 100/10 BaseT module connectors 802, 804, 806 and 808 are option module connectors which may communicate with the back panel connectors 702, 704, 706 and 708, respectively, and with the switch 810, to send and receive data. Power line interfaces 812 and 814 also communicate with the switch 810 to send and receive data. The power line interfaces 812 and 814 include power protection, and Ethernet transmit/receive capability. The power line interfaces 812 and 814 deliver DC power and transmit/receive digital communications signals to one or more cables of the digital intercom network via the connectors on the back panel of the master station. For example, power line interface 812 is associated with XLR connectors 720 and 724, and power line interface 814 is associated with XLR connectors 722 and 726. The power line interfaces provide a capability which is similar to that of the user stations as discussed previously in implementing the MAC and PHY layers of the protocol stack in addition to providing an analog front end. See FIG. 8*b* for further details.

A router 816, which may be implemented as a DSP, also communicates with the switch 810. The router provides a routing and forwarding capability for digital data packets in the network over three or more channels, as described further below in connection with FIGS. 10*a*-12*c*. Ethernet 100/10 BaseT module connectors 818 and 820, which are Ethernet fiber or copper interfaces, also communicate with the switch 810.

A DSP 830 also communicates with the switch 810, and includes a memory. The DSP 830 interacts with a GPIO component 816, which is associated with the back panel connector 716, and with keyset components 845, user interface elements 846, and USB interface 850, which are associated the respective front panel components 745, 746 and 750, respectively. The DSP 830 can communicate Ethernet packets to the switch 810.

A codec 840 communicates with a number of components including connectors 830 and 832 which are associated with the program in (broadcast) connector 730 and the hot mic out connector 732, respectively, on the back panel. The codec 840 also communicates with components 828, 842 and 844, which are associated with the stage announce output 728, the headset out connector 742, and the mic in connector 744, respectively on the front panel. The codec 840 can also drive a loudspeaker 843. There is analog circuitry (not shown) between the codec 840 (or ADC/DAC combination) and the input/output connectors.

An internal power supply unit (PSU) 854 and a power conversion component 856 are also provided. The master station is powered by a mains supply (100-240V) and has internal power supplies converting that to a DC voltage. There are then further on-board power supply circuits converting that DC level to the supply voltages needed by the circuitry. The master station can provide an output at the back panel connectors with an appropriate voltage, current and power.

The router 816 provides a routing and forwarding capability for digital data packets in the network, to provide digital point-to-point, digital point-to-multi-point, and digital party line communications among the user stations according to their respective network addresses. Various types of routing techniques can be used. An example routing technique is provided in PCT patent publication WO2009/015460, published Feb. 5, 2009, titled "Multi-Point To Multi-Point Intercom System," by Talk-Dynamics Corp., Montreal, Canada, which is incorporated herein by reference. In this technique, intercom terminals are registered as talking or listening intercom terminals in an intercom session table. An intercom server sends to the listening intercom terminals some or all of the unmixed audio packets received by a talking intercom terminal according to an intensity signal value located in the header of the unmixed audio packets. Talk-Dynamics provides low-latency (5-10 ms) IP technology that is capable of connecting 100+ users in a conference call in the V-SERIES user panel, manufactured by CLEAR-COM, VITEC GROUP COMMUNICATIONS, LLC, Alameda, Calif., USA. Other routing techniques may be used as well.

Figure 8B:
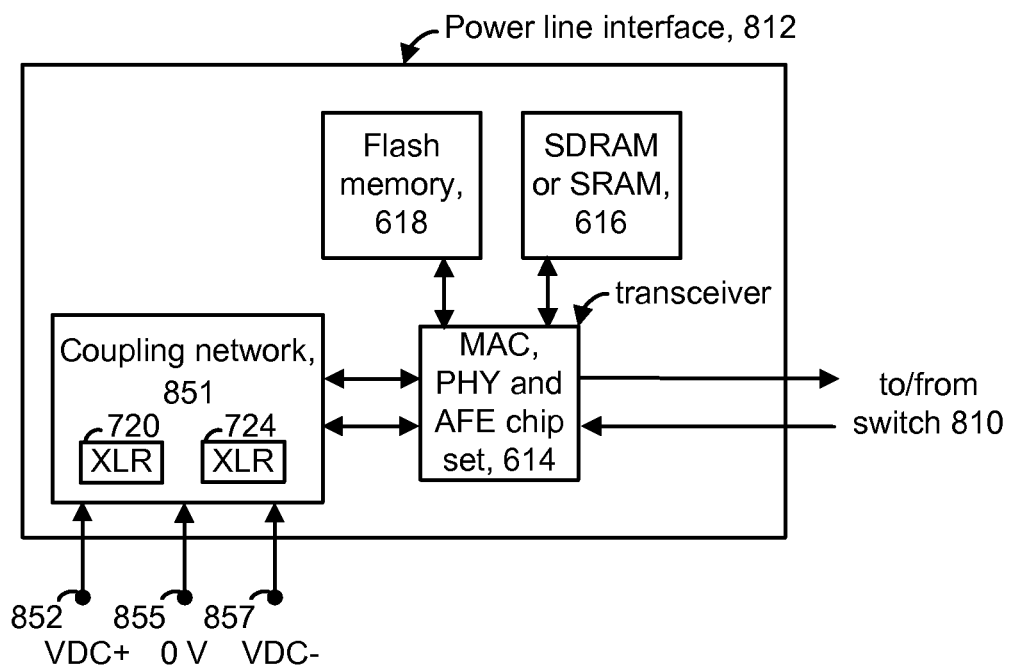

FIG. 8*b* depicts an exemplary block diagram of a power line interface of FIG. 8*a*. As mentioned, the power line interfaces 812 and 814 of FIG. 8*a* provide a capability which is similar to that of the user stations as discussed previously in implementing the MAC and PHY layers of the protocol stack in addition to providing an analog front end. Each of the power line interfaces can include any of the chips mentioned previously, for instance. For example, the power line interface 812 can include the chip set 614, flash memory 618 and SDRAM or SRAM 616, in addition to a coupling network 850 which includes the XLR connectors 720 and 724, for instance. The coupling network 850 is analogous to the coupling network 610 of FIG. 6*a*. In another possible option, the chip set 614 can be replaced by the chips 654 and 650 of FIG. 6*b*. DC power form the PSU 854 is provided to the coupling network 850 via terminals 852, 854 and 856. Specifically, a positive potential (VDC+), a ground potential (0 V) and a negative potential (VDC−) are provided to the terminals 852, 854 and 856, respectively. Many other implementations are possible.

FIG. 9*a* depicts an exemplary routing table, and FIGS. 9*b* and 9*c* depict routing of a packet between user stations using the routing table shown in FIG. 9*a*. Generally, selective communication of audio packets over a digital network can be achieved by assigning IP addresses or other network addresses or identifiers to the user stations, and assigning the user stations to groups or sessions based on their respective network addresses. Moreover, one or more of such groups or sessions can be defined and can be concurrently active. For example, the router 816 of a master station may maintain a routing table for a particular session, session 1, which associates one or more network addresses of talker user stations with one or more network addresses of listener user stations. The router 816 can be configured with the session such as by connecting a computing device to the master station which has a GUI which allows a user to configure the appropriate settings. In another approach, the master station is updated remotely such as via a web-based GUI. FIG. 9*a* illustrates that the talkers are associated with user stations having network addresses of IP2 and IP3 and the listeners are associated with user stations having network addresses IP2 and IP4.

As depicted in FIG. 9*b*, when a user speaks into the user station associated with IP2, the user station transmits audio by sending digital packets to the master station 900, which identifies the sender's address IP2 and an address IP5 of the master station 900 as the recipient. The router at the master station identifies IP2 as the address associated with the sender/talker, and determines which user stations are listeners for a current session. The packets are routed from the master station to the user station of IP4 based on the routing table, allowing the user operating the user station associated with IP4 to hear the user talk. In particular, the router can send packets from the master station to the user station of IP4 which identify IP4 as the recipient and the master station IP5 as the sender. The IP4 user station receives the digital packets from the master station and converts them to an analog audio output. The other user stations examine the packets to determine that they are not addressed to them and do not retrieve them. In this case, there is only one recipient, in a point-to-point communication.

In FIG. 9*c*, the IP3 user station is the sending device. The routing DSP at the master station identifies IP3 as the address of the sender/talker, and determines which user stations are listeners for a current session. From the routing table of FIG. 9*a*, IP2 and IP4 are addresses of listeners. The packets are thus routed to the IP2 and IP4 user stations as listeners, so that the associated user can hear the user associated with the IP3 user station talk. In particular, the router can send packets from the master station which identify IP2 and IP4 as the recipients and the master station 1P5 as the sender. In this case, there are multiple recipients, in a point-to-multi point communication.

In routing, the packets can be numbered so that the master station or a destination user station can tell whether it received all the packets intended for it, and if it does not receive some packets, it can report back to any element of the system so that the problem can be noted.

Figures 10A, 10B:
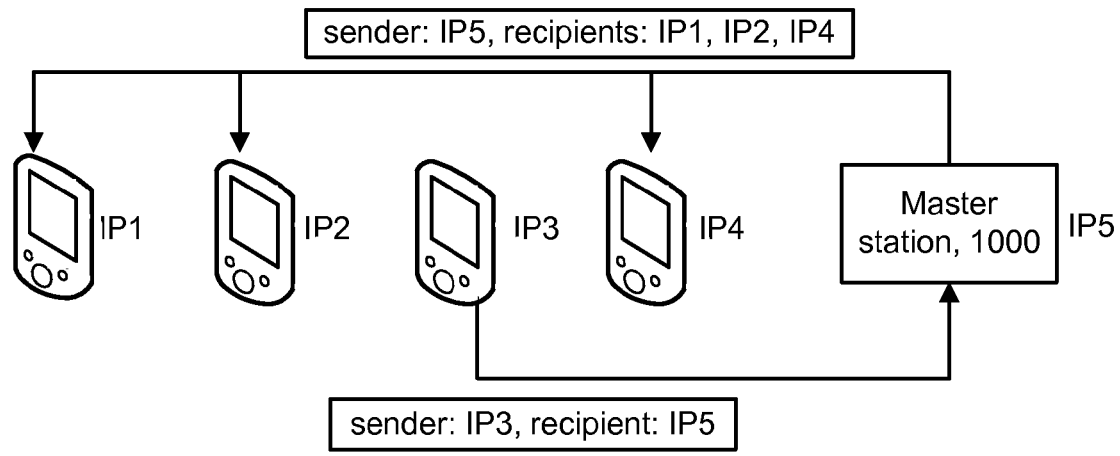

FIG. 10*a* depicts another exemplary routing table, and FIG. 10*b* depicts routing of a packet between user stations using the routing table shown in FIG. 10*a*. This case represents point-to-multi point communication and party line communication. A party line communication from one user station can be heard by all other user stations in the intercom network. Here, the routing table identifies all other addresses (IP1, IP2 and IP4) when the user associated with the IP3 user station is talking. Alternatively, a wild card can be used in a packet which indicates that all user stations are to retrieve the packet.

In FIG. 10*b*, the IP3 user station sends a packet to the master station 1000. The router at the master station routes the packet for retrieval by the associated IP1, IP2 and IP4 user stations, and the master station is identified as the sender.

Figures 11A, 11B:
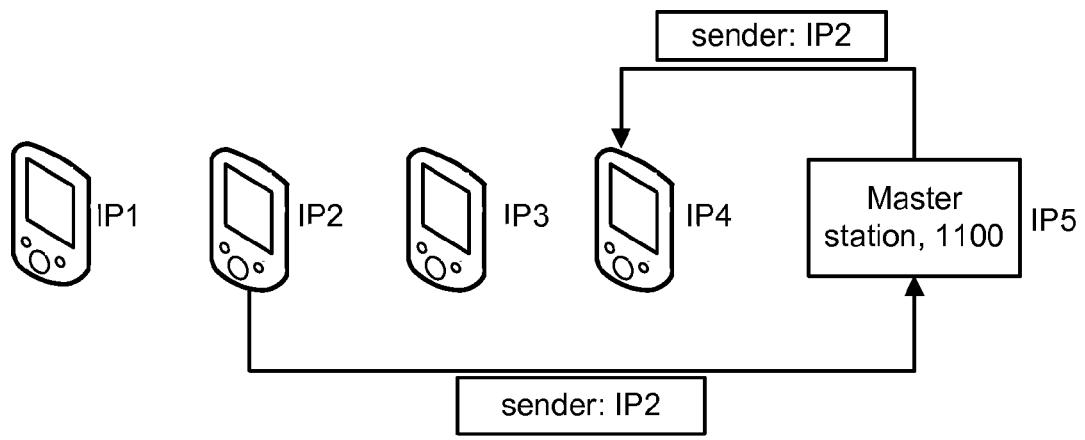
FIG. 11a depicts an exemplary table of listener intercoms.
FIG. 11b depicts forwarding of a packet using the table.

FIG. 11*a* depicts an exemplary table of listener user stations, and FIG. 11*b* depicts forwarding of a packet using the table. In this case, the user stations have the intelligence to know the group or session in which they are participating. For example, the user stations can be configured with such information, such as by connecting each user station manually to a computing device which programs in the corresponding group or session information, or automatically such as by receiving the configuration information as control data from the master station. Thus, a routing capability is not needed at the master station. Instead, the master station forwards the packets in the same network from which they were received and/or one or more other networks. For example, for a "user station 4," having a unique identifier IP4, the unique identifiers of other intercoms for which user station 4 is a listener are IP1 and IP2. Thus, the IP4 user station will listen to the IP1 and IP2 user stations, but not to other user stations.

In FIG. 11b, the IP2 user station sends audio packets with IP2 as the sender's identifier on the network. The master station 110 forwards the packets back onto the same or a different network, keeping IP2 as the sender's identifier. The IP4 user station examines the packets to determine the sender's identifier, and uses the table of listener user stations to determine that it is a listener for the packet. The IP4 user station retrieves the digital packets for which it is a listener and converts them to an analog audio output. The other user stations examine the packets similarly to determine whether or not to retrieve them. In this case, a user station can retrieve a packet even if it is not forwarded by the master station but is received directly from the sending user station in the same network.

FIG. 12a depicts an exemplary first process for selectively communicating data packets among user stations. The examples of FIGS. 9a-10b are compatible with this process. Generally, this process involves each user station connecting to the master station, such as when the user station is powered on, to obtain an identifier and session information. For example, at step 1200, the user station connects to the master station to obtain a unique identifier. The user station may optionally provide credentials which allow it to securely login to the network. Encryption may also be used to enhance security.

At step 1202, the user station obtains a list of available sessions from the master station. At step 1204, the user station sends a request to join one or more sessions, based on preconfigured settings of the user station or based on a user selection, for instance. At this point, the user station is configured and ready to begin communicating audio to other user stations, when the user desires to talk. At step 1206, the user talks, and the user station communicates audio packets with its unique identifier to the master station. At step 1208, the master station determines one or more sessions which the user station has joined. At step 1210, the master station determines the unique identifiers of listener user stations in the one or more sessions. At step 1212, the master station routes packets to the listener user stations using their identifiers.

FIG. 12b depicts an exemplary second process for selectively communicating data packets among user stations. The examples of FIGS. 9a-10b are compatible with this process. At step 1220, the user station is configured with a unique identifier. At step 1222, the master station is configured with sessions, where each session identifies talking and listening user stations. At step 1224, the user station communicates audio packets with its unique identifier to the master station. At step 1226, the master station determines one or more sessions to which the user station has been assigned. At step 1228, the master station determines the unique identifiers of listener user stations in the one or more sessions. At step 1230, the master station routes packets to the listener user stations using their identifiers.

FIG. 12c depicts an exemplary third process for selectively communicating data packets among user stations. The examples of FIGS. 11a and 11b are compatible with this process. At step 1250, each user station is configured with a unique identifier and a list of unique identifiers of other user stations for which it is a listener. At step 1252, a user station communicates audio packets with its unique identifier on the network. At step 1254, the master station forwards the packets to other user stations in the same and/or different networks. At step 1256, the other user stations listen to packets if the packet's unique identifier is on their respective list of other user stations for which it is a listener.

FIG. 13 depicts an exemplary process for retrofitting an analog intercom network to provide a digital communication capability. As mentioned at the outset, the techniques and systems provided herein allow easy retrofitting of existing analog intercom networks with digital equipment to provide full featured, multi-channel digital communications over existing cabling. In a corresponding retrofitting process, step 1300 includes beginning the retrofit of an existing analog network. Step 1302 includes disconnecting the existing analog master station and analog user stations from the cable network. This can simply involve disconnecting the XLR or other cable connectors. Step 1304 includes connecting a digital master station and digital user stations to the cable network. This can simply involve reconnecting the XLR or other cable connectors. Step 1306 includes providing DC power from the digital master station to the digital user stations via the cable network. Step 1308 includes providing bidirectional digital communications among the digital master station and the digital user stations in the cable network, including routing and/or forwarding of digital data packets. The bidirectional (two-way) digital communications can occur concurrently or at different times.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

What is claimed is:

1. A digital intercom network, comprising:
    a cable network forming a first conductive path and a second conductive path;
    a first user station;
    a second user station; and
    a master station connected to the first user station and the second user station via the cable network such that the first conductive path connects the master station with the first user station and the second conductive path connects the master station with the second user station, wherein the second conductive path runs through the first user station, the master station comprising:
        a DC power supply that provides DC power to the first user station that powers the first user station through the first conductive path, and that provides DC power to the second user station that powers the second user station second through the second conductive path;
        a transceiver that provides bidirectional digital communications with the first user station through digital signals sent and received over the first conductive path, and that provides bidirectional digital communications with the second user station through digital signals sent and received over the second conductive path; and
        a router in communication with the transceiver, the router being configured (i) to route digital data packets for the first user station to the first user station over the first conductive path, and (ii) to route digital packets for the second user station to the second user station over the second conductive path.

2. The digital intercom network of claim 1, wherein the cable network forms a third conductive path, wherein the third conductive path provides a redundant operative coupling between the master station and the first user station, and wherein the third conductive path includes a portion of the second conductive path.

3. The digital intercom network of claim 1, wherein the transceiver is configured such that digital data packets routed to the first user station are provided to the first user station via the digital signals communicated between the first user station and the transceiver over the first conductive path.

4. The digital intercom network of claim 2, wherein the transceiver is configured such that digital packets routed to the second user station are provided to the second user station via the digital signals communicated between the second user station and the transceiver over the second conductive path.

5. A master station for use in a digital intercom network, the master station comprising:
- a first connector which is configured to be connected to a cable network that forms a first conductive path to a first user station and forms a second conductive path to a second user station, wherein the second conductive path runs through the first user station;
- a DC power supply configured to provide DC power to the first user station that powers the first user station through the first conductive path, and configured to provide DC power to the second user station that powers the second user station second through the second conductive path;
- a transceiver configured to bi-directionally, digitally communicate with the first user station through digital signals sent and received over the first conductive path, and configured to bi-directionally, digitally communicate with the second user station through digital signals sent and received over the second conductive path; and
- a router in communication with the transceiver, the router being configured (i) to route digital data packets for the first user station to the first user station over the first conductive path, and (ii) to route digital packets for the second user station to the second user station over the second conductive path.

6. The master station of claim 5, wherein the transceiver is configured to bi-directionally, digitally communicate with the second user station via digital signals that pass through the first user station.

7. The master station of claim 6, wherein the transceiver is further configured to bi-directionally, digitally communicate with the second user station via digital signals that do not pass through the first user station.

8. The master station of claim 5, wherein the transceiver is configured such that digital data packets routed to the first user station are provided to the first user station via the digital signals communicated between the first user station and the transceiver over the first conductive path.

9. The master station of claim 5, wherein the transceiver is configured such that digital packets routed to the second user station are provided to the second user station via the digital signals communicated between the second user station and the transceiver over the second conductive path.

10. The digital intercom network of claim 1, wherein the first conductive path and the second conductive path are cables configured to conduct electric signals.

11. The master station of claim 5, wherein the first conductive path and the second conductive path are cables configured to conduct electric signals.

* * * * *